United States Patent
Grinberg et al.

(10) Patent No.: US 12,182,363 B2
(45) Date of Patent: Dec. 31, 2024

(54) TOUCHSCREEN SENSOR CALIBRATION USING ADAPTIVE NOISE CLASSIFICATION

(71) Applicant: Microsoft Technology Licensing, LLC, Redmond, WA (US)

(72) Inventors: Hanan Grinberg, Ramat-Gan (IL); Oren Istrin, Tel Aviv (IL); Hadas Ruas, Netanya (IL); Nadav Linenberg, Even Yehuda (IL); Anton Gorbanev, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/808,278

(22) Filed: Jun. 22, 2022

(65) Prior Publication Data
US 2023/0418416 A1  Dec. 28, 2023

(51) Int. Cl.
G06F 3/041 (2006.01)

(52) U.S. Cl.
CPC ........ G06F 3/04182 (2019.05); G06F 3/0412 (2013.01); *G06F 2203/04114* (2019.05)

(58) Field of Classification Search
CPC .............. G06F 3/04182; G06F 3/0412; G06F 2203/04114
USPC ......................................... 345/173
See application file for complete search history.

(56) References Cited

U.S. PATENT DOCUMENTS

| | | | |
|---|---|---|---|
| 7,995,036 B2 | 8/2011 | Rimon et al. | |
| 8,531,375 B2 | 9/2013 | Komori | |
| 9,223,452 B2 | 12/2015 | Lu et al. | |
| 10,067,575 B2 | 9/2018 | Agarwal et al. | |
| 10,338,704 B2 | 7/2019 | Coppin et al. | |
| 10,521,042 B2 | 12/2019 | Lu et al. | |
| 10,599,276 B2 | 3/2020 | Chandran et al. | |
| 10,928,955 B1 * | 2/2021 | Reed | G06F 3/04182 |

(Continued)

FOREIGN PATENT DOCUMENTS

| | | |
|---|---|---|
| EP | 2846218 A1 | 3/2015 |
| EP | 3402074 A1 | 11/2018 |

(Continued)

OTHER PUBLICATIONS

Gao, et al., "Reduction of Noise Spikes in Touch Screen Systems by Low Pass Spatial Filtering", In Journal of Display Technology, vol. 12, Issue 9, Sep. 1, 2016, pp. 957-963.

(Continued)

*Primary Examiner* — Jimmy H Nguyen
(74) *Attorney, Agent, or Firm* — Holzer Patel Drennan

(57) ABSTRACT

A base noise level of a touchscreen interface for a computing device is actively and adaptively calibrated. Antenna traces forming a digitizer of the touchscreen interface are allocated into antenna regions. Antenna regions with high energy signal levels and antenna regions with low energy signal levels are identified. Signal level information from high energy antenna regions is discarded. A noise level, caused by electrical components of the computing device, is determined within signals generated in the antenna traces based at least in part upon the low energy antenna regions. The digitizer is calibrated by reducing energy levels of signals carried by the antenna traces in all antenna regions by the noise level.

21 Claims, 8 Drawing Sheets

(56) References Cited

U.S. PATENT DOCUMENTS

| | | | |
|---|---|---|---|
| 2005/0189154 A1* | 9/2005 | Perski | G06F 3/04182 |
| | | | 178/18.06 |
| 2006/0069832 A1 | 3/2006 | Imaizumi | |
| 2013/0106779 A1* | 5/2013 | Company Bosch | G06F 3/044 |
| | | | 345/174 |
| 2014/0152582 A1* | 6/2014 | Agarwal | G06F 3/0418 |
| | | | 345/173 |
| 2014/0160038 A1* | 6/2014 | Lee | G06F 3/0446 |
| | | | 345/173 |
| 2016/0291792 A1 | 10/2016 | Sawahata et al. | |
| 2019/0278388 A1 | 9/2019 | Barel et al. | |
| 2020/0192527 A1* | 6/2020 | Matsuda | G06F 3/04162 |
| 2021/0191563 A1 | 6/2021 | Reed et al. | |

FOREIGN PATENT DOCUMENTS

| | | |
|---|---|---|
| EP | 3678000 A1 | 7/2020 |
| JP | H0799669 A | 4/1995 |

OTHER PUBLICATIONS

"International Search Report and Written Opinion Issued in PCT Application No. PCT/US23/021813", Mailed Date: Aug. 11, 2023, 13 Pages.

* cited by examiner

ADAPTIVE FLOOR NOISE LEVEL – MAX HOLD PERIODS

TOUCHSCREEN SENSOR CALIBRATION USING ADAPTIVE NOISE CLASSIFICATION

BACKGROUND

Modern computing devices are often equipped with touchscreen interfaces that both present information to a user visually as a video display and receive input from a user by identifying and tracking one or more locations where the user interacts with the touch screen display. The user may interact with the touchscreen using one or more fingers or a stylus, which may or may not be powered.

SUMMARY

The described technology actively and adaptively calibrates a base noise level of a touchscreen interface for a computing device. Antenna traces forming a digitizer of the touchscreen interface are allocated into antenna regions. Antenna regions with high energy levels and antenna regions with low energy levels are identified. Signal level information from high energy antenna regions is discarded. A noise level, caused by electrical components of the computing device, is determined within signals generated in the antenna traces based at least in part upon the low energy antenna regions. The digitizer is calibrated by reducing energy levels of signals carried by the antenna traces in all antenna regions by the noise level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The disclosure will be readily understood by the following detailed description in conjunction with the accompanying drawings.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1:
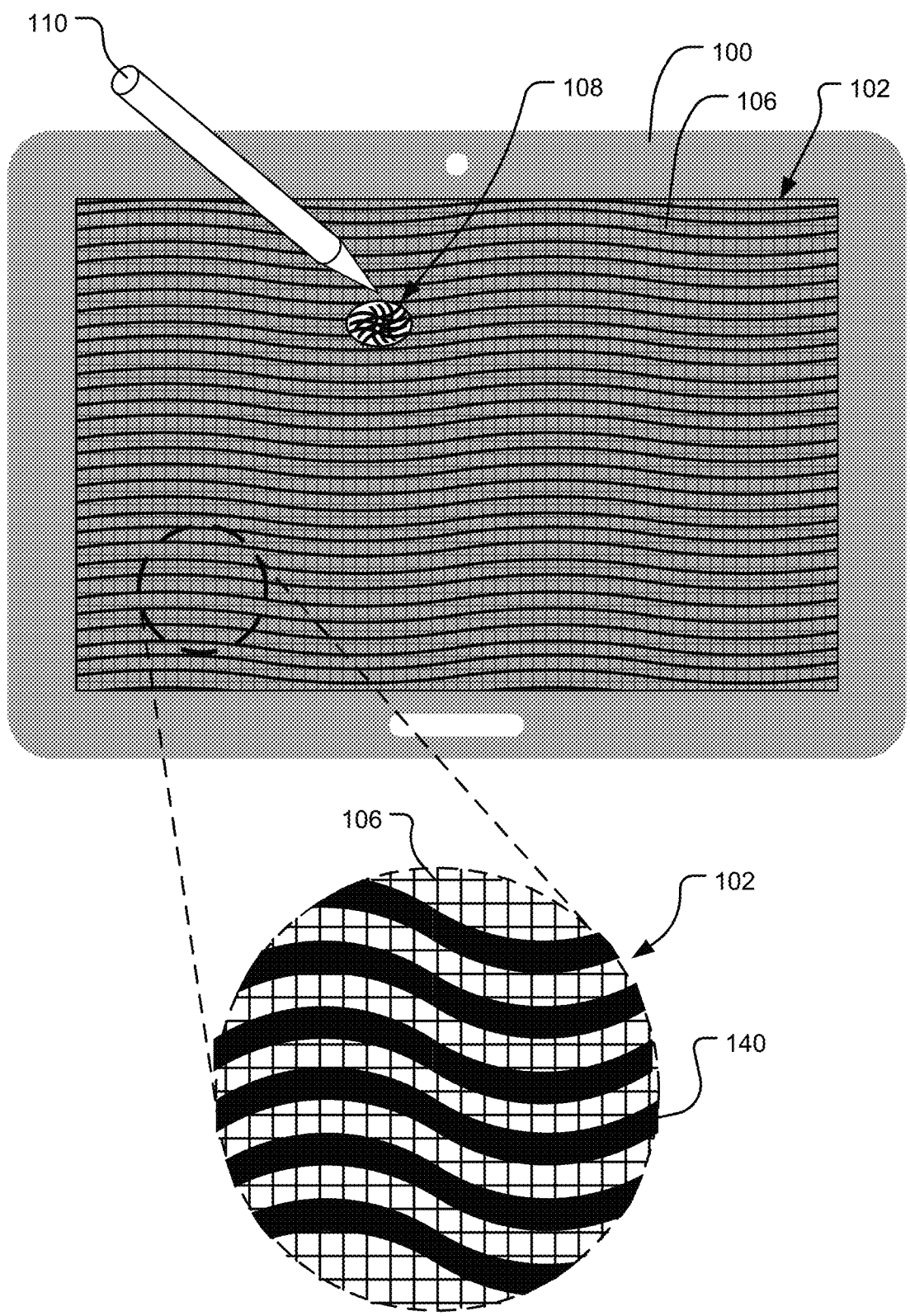

FIG. 1 provides a schematic illustration of an example computing device with a touchscreen interface.

Figure 2:
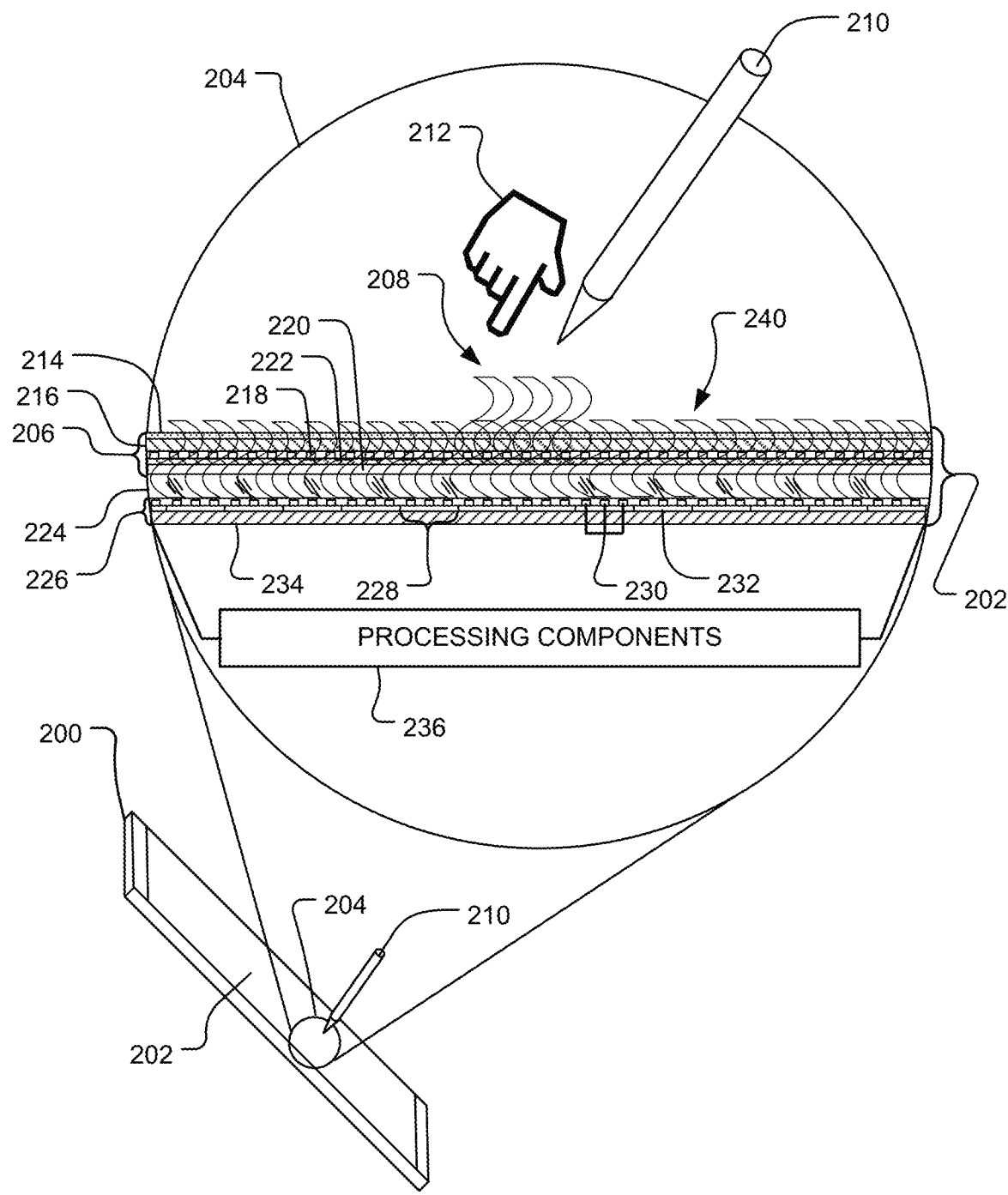

FIG. 2 provides a schematic illustration of an example hardware construction of a touchscreen interface for a computing device.

Figure 3A:
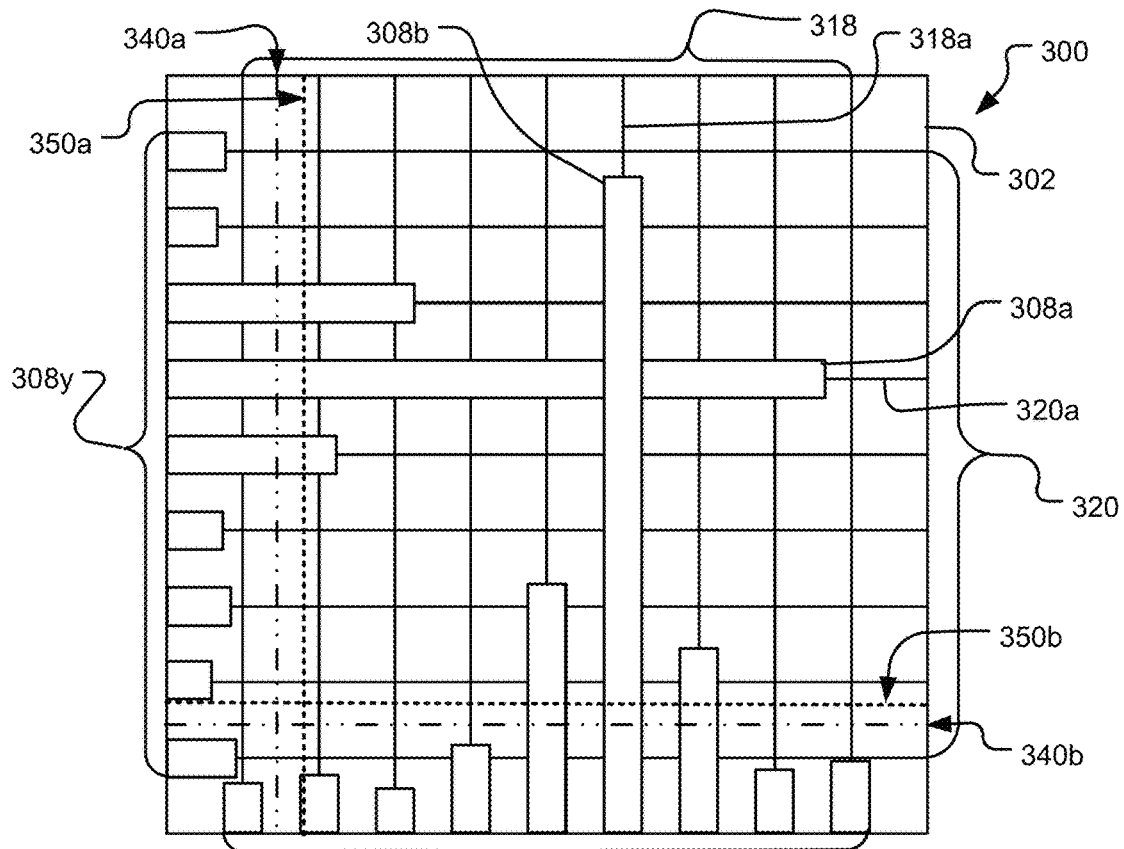

FIG. 3A provides a schematic illustration of an example region of a touchscreen interface showing energy levels of electrical signals along antenna traces in the region oriented in a first direction.

Figure 3B:
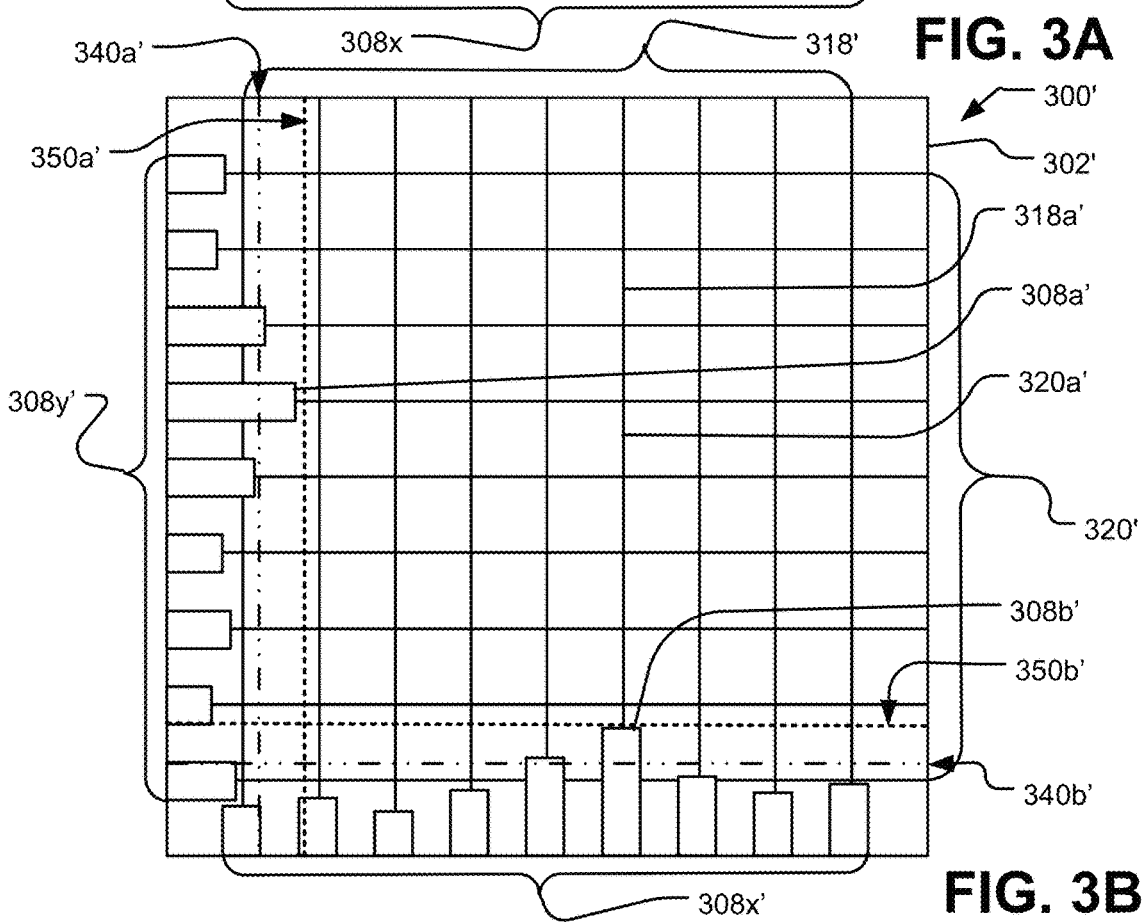

FIG. 3B provides a schematic illustration of the example sector of a touchscreen interface showing energy levels of electrical signals along antenna traces in the region oriented in a second direction.

Figure 4:
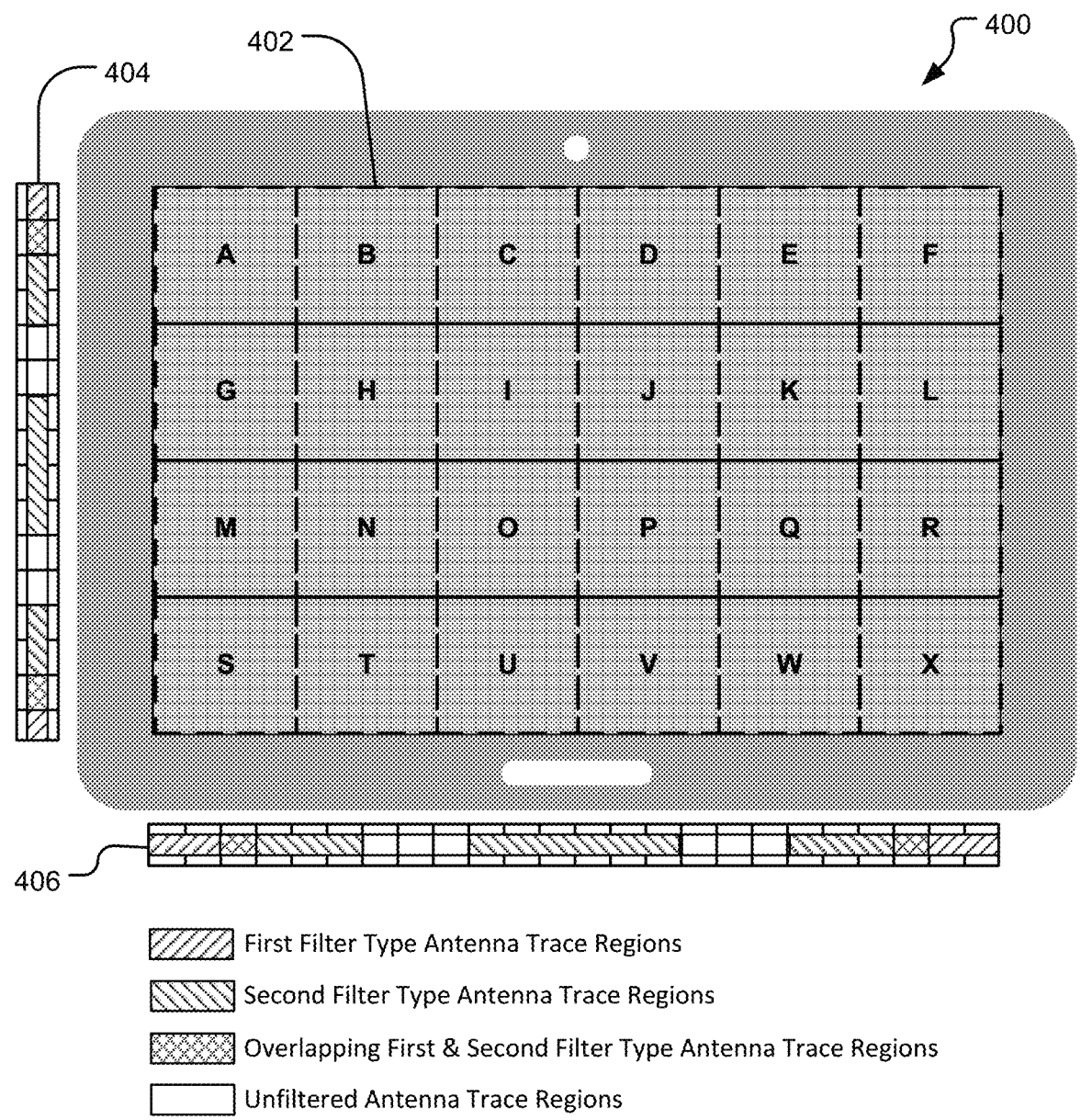

FIG. 4 provides a schematic illustration of example sectors of a touchscreen interface and indicates regions in which different types of noise reduction may be implemented.

Figure 5:
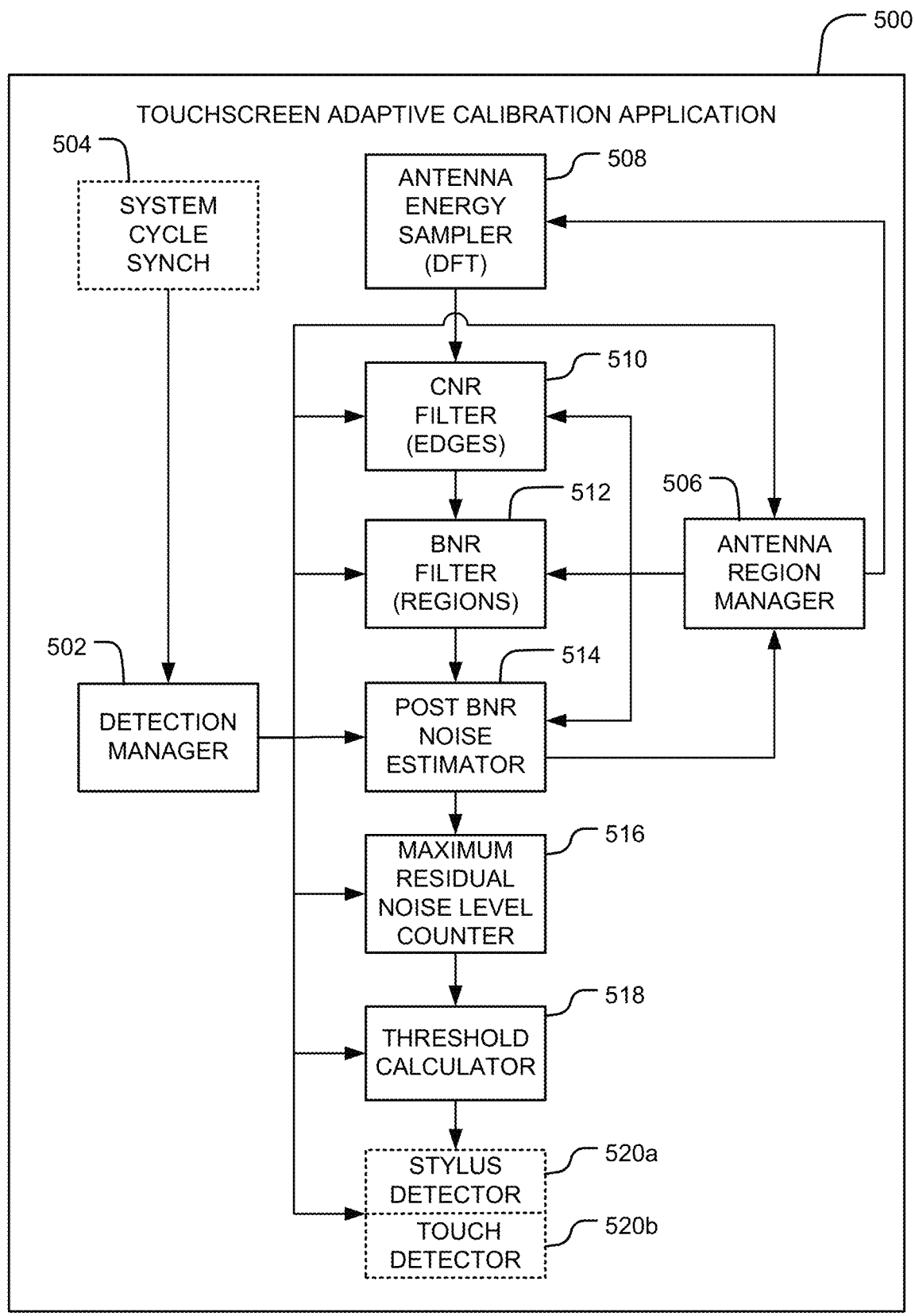

FIG. 5 provides a schematic illustration of an example embodiment of an application program with a collection of software routines that cooperatively calibrate a noise level for a touchscreen interface of a computing device.

Figure 6:
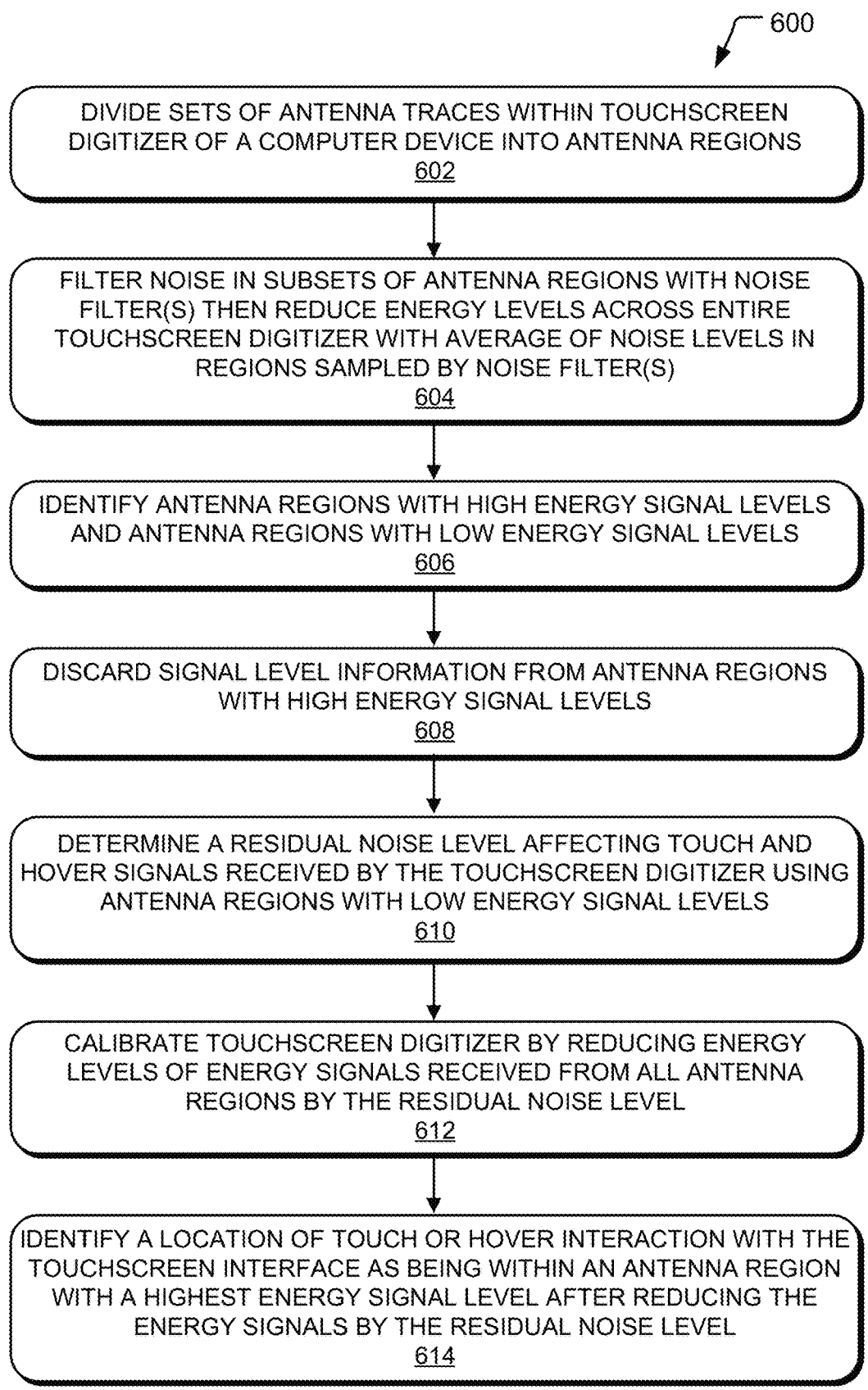

FIG. 6 provides a flow diagram of an example method for calibrating a touchscreen sensor with adaptive noise classification.

Figure 7A:
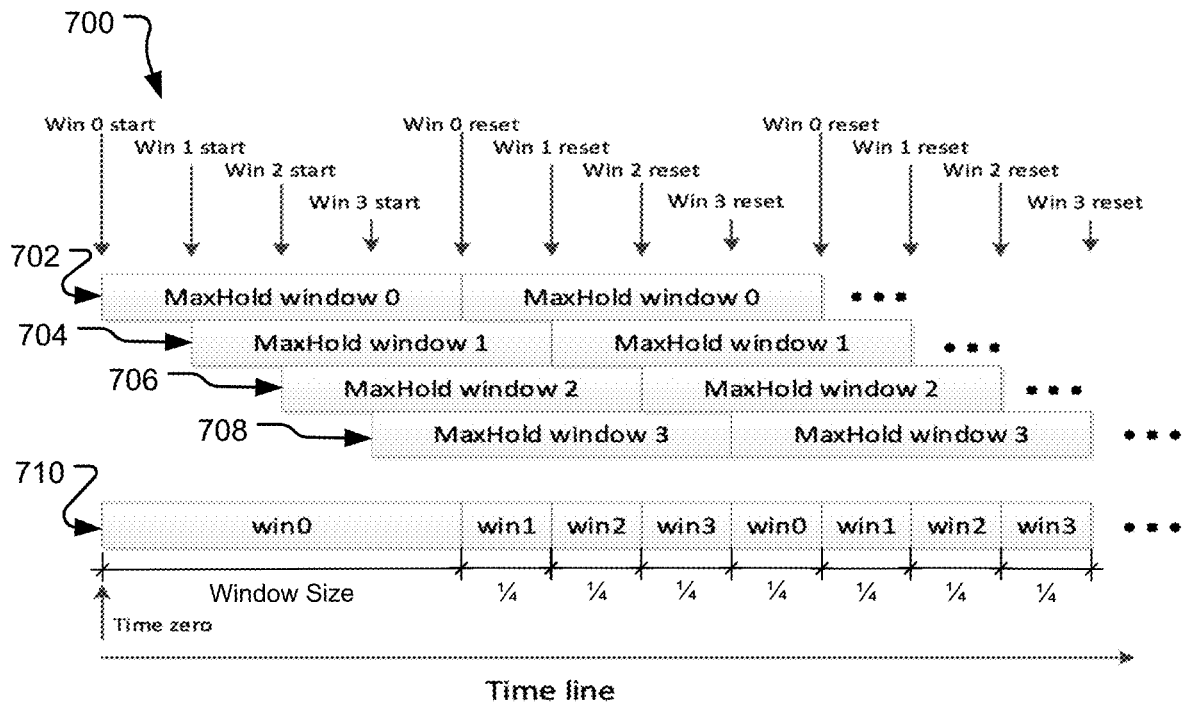

FIG. 7A provides a schematic illustration of an operation of an example embodiment of an adaptive residual maximum noise level counter process.

Figure 7B:
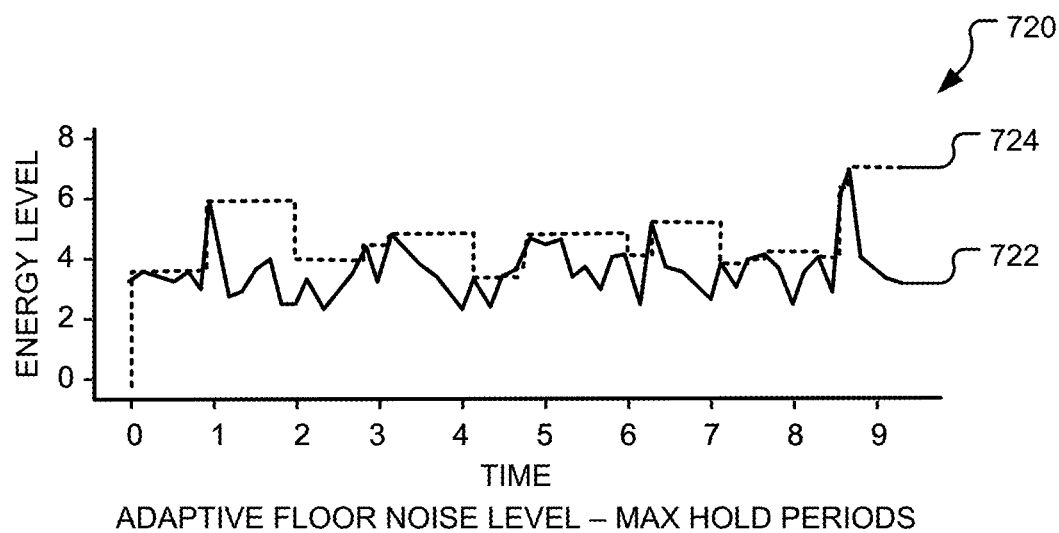

FIG. 7B provides a schematic illustration of example output results of an adaptive maximum residual noise level counter process.

Figure 8:
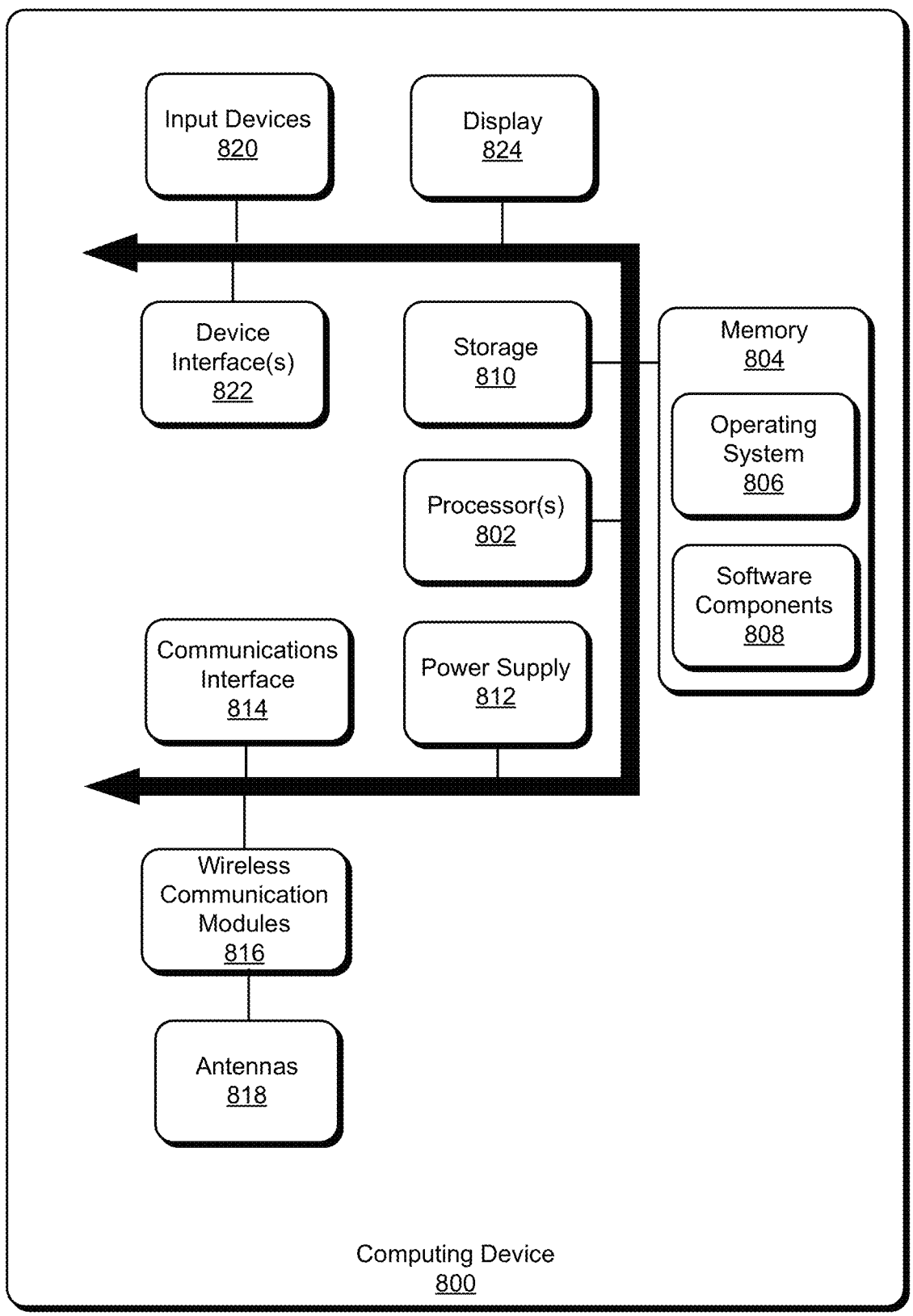

FIG. 8 provides a schematic illustration of an example of a computing device in which a touchscreen interface may be incorporated for user interaction including for both user input and display output to the user.

DETAILED DESCRIPTION

Touchscreen interfaces for computing devices both present information to a user visually as a video display and receive input from a user by identifying and tracking one or more locations where the user interacts with the touch screen display. The user may interact with the touchscreen using one or more fingers or a stylus device, which is a writing pen-like device specifically configured for physical interaction with the touchscreen interface. There are many different types of stylus devices, which may or may not be powered. If powered, the stylus devices may further communicate wirelessly with the computing device (e.g., via Bluetooth® protocol) to provide additional input information in conjunction with the physical contact of the stylus on the touchscreen. The hardware and processing algorithms behind the touchscreen display are configured to differentiate between fingers, pens with or without conductive tips, and active, powered stylus devices, and also discern between valid touch interactions and interactions that should be ignored.

There are presently several different technologies underlying touchscreen interfaces, including resistive, capacitive, and near field imaging, each of which has its own advantages and disadvantages. Resistive touchscreens may be understood as "transparent keyboards" overlaid on top of the screen. Typically, a flexible, transparent upper layer of conductive polyester plastic is placed above a rigid lower layer of glass printed with transparent conductive traces. The polyester plastic and the glass are separated by a thin insulating air gap. A voltage is applied to one layer and sensed by the other. When a user presses on the touchscreen, the conductive polyester layer is forced to touch the conductive traces on the glass and complete a circuit. This pressure contact is similar to pressing a key on a keyboard to complete an electrical connection. The touchscreen panel then behaves as a pair of voltage dividers, one axis at a time.

By rapidly switching between each layer, the position of pressure on the screen can be detected by a processer chip and determine the coordinates of the location touched.

Capacitive touchscreens are typically made with two conductive layers separated by an insulating layer, thus forming a structure that functions as a capacitor. Each of the conductive layers may be formed by a transparent substrate, e.g., glass or a plastic, printed with patterns of conductive traces. When a user places a finger or stylus on or near the touchscreen, the electric field generated by current in the traces is altered by a certain amount that varies according to where the finger or stylus is located. The coordinates of the location touched are determined by a processor that interprets the changes in electric fields of the touchscreen. Capacitive touchscreens can be touched in more than one place at once. However, they do not work if touched with a plastic stylus because the plastic is an insulator, which does not affect or alter the electric field.

Near field imaging (NFI) touchscreens work in a similar manner to capacitive touchscreens by monitoring changes in the electric fields generated by signals coursing through antenna structures formed within the touchscreen. As a user moves a stylus or finger closer to the surface of the touchscreen, the electric field changes, which is registered as a touch. NFI touchscreens can detect touches from both conductive and non-conductive materials, e.g., plastic pens or even hands wearing gloves.

Notably, each of these touchscreen technologies, resistive, capacitive, and NFI, create electric fields, either as a byproduct of current in the interface structure (i.e., with resistive touchscreens) or for the express purpose of identifying and locating a touch interaction by a user (i.e., with capacitive and NFI touchscreens). Unfortunately, other components of the computing devices incorporating touchscreen interfaces may also generate electric fields that can interfere with the electric fields of the touchscreen interfaces, thereby making identification of user touch interactions more difficult to discern. This interference is commonly referred to as "noise." (While resistive touchscreens are less impacted by noise because they operate through creation of an actual electric connection, if the noise level is high enough, it can induce an electrical current, which could falsely indicate touch.) The most common source of noise in a touchscreen interface is from the video display generator unit that is positioned beneath and fully contiguous with the touch sensor components of the touchscreen.

An example computing device 100 with a touchscreen interface 102 is depicted schematically in FIG. 1. A stylus 110 is depicted above the surface of the touchscreen interface 102 and causes a region of disturbance in an electric field corresponding to a touch location 108. For the purposes of this disclosure, a touch sensor or "digitizer" 106 is a mesh of electrical traces or antennas formed within the structure of the touchscreen interface 102. In resistive touchscreen technologies, the touch sensor or digitizer 106 is composed of the contact traces on the glass substrate that are connected to the upper conductive polyester layer under pressure. In capacitive touchscreen technologies, the touch sensor or digitizer 106 is composed of the conductive traces on the opposing surfaces forming the capacitive touch interface. In NFI touchscreen technologies, the touch sensor or digitizer 106 is composed of the conductive antenna traces. For the purposes of this disclosure, hereinafter, reference to a digitizer 106 is intended to include reference to the conductive traces in any of these touch sensor technologies, which may generate generally consistent electric fields across the surface of the corresponding touchscreen interface. Further, for the purposes of this disclosure, the patterns of conductive traces on substrates used for stylus and finger tracking in any of these touchscreen technologies will hereinafter be referred to as "antenna traces" for convenience as all create electric fields and exhibit properties of antennas.

In each of these technologies, changes in electric fields generated by the digitizer 106 may be measured and recognized as signals from an active stylus or user fingers touching or hovering above a touchscreen interface 102. Such a change in the electric field caused by a stylus or user finger is represented by touch location 108 located beneath the tip of the stylus 110. Noise 140, e.g., interfering electric fields, caused by other components of the computing device 100, and even other components of the touchscreen itself, such as the display generator, is represented by the waves extending across the area of the touchscreen interface 102.

FIG. 2 is a schematic diagram of example layers of a capacitive touchscreen interface 202 of a computing device 200. An area 204 of the touchscreen interface 202 is depicted in an enlarged cross-section. A stylus 210 or finger 212 are depicted above the area 204 as interacting with the electric field in that location. FIG. 2 is presented in the context of a capacitive touchscreen technology as an example only and for brevity; the concepts presented with respect to FIG. 2, as referenced further herein for purposes of describing the adaptive calibration of touchscreen interfaces, are intended to be generally applicable to antenna trace layers in resistive and NFI touchscreen technologies in which electric fields generated therein may similarly be used to identify touch interactions.

As shown in FIG. 2, the touchscreen interface 202 may be composed of two primary structures, the digitizer 206 and a display generator 226 (e.g., an LCD or LED display generator). The digitizer 206 may be composed of a transparent protective cover layer 214 as the top surface of the touchscreen interface 202 that is adhered to a transparent flexible substrate 216. An array of upper antenna traces 218 may be formed on the bottom surface of the flexible substrate 216. The upper antenna traces 218 may be made of a conductive transparent material, e.g., indium tin oxide, printed on the flexible substrate 216. The upper antenna traces 218 may be generally parallel to each other and may be electrically coupled to one or more conductive plates along one or more edges of the touchscreen interface 202. Subsets of the upper antenna traces 218 may be grouped into several different antenna sections, each electrically connected to a separate conductive plate along the edge of the touchscreen interface 202.

An electrically insulating layer 222 may be positioned beneath the upper antenna traces 218 on the bottom surface of the flexible substrate 216. A glass layer 224 may be positioned beneath the electrically insulating layer 222. An array of lower antenna traces 220 may be formed on the top surface of the glass layer 224. The lower antenna traces 220 may be made of a conductive transparent material, e.g., indium tin oxide, printed on the top surface of the glass layer 224. In an alternative embodiment, the lower antenna traces 220 may be printed on a second transparent flexible substrate (not shown) adhered to the top surface of the glass layer 224. The lower antenna traces 220 may be generally parallel to each other and may be electrically coupled to one or more conductive plates along one or more edges of the touchscreen interface 202. The lower antenna traces 220 may be oriented perpendicular to the direction of the upper antenna traces 218. Subsets of the lower antenna traces 220 may be grouped into a number of different antenna sections, each corresponding to an opposing antenna section in the array of upper antenna traces 218. Each subset of the lower antenna traces 220 may be electrically connected to a separate conductive plate along the edge of the touchscreen interface 202.

When a stylus 210 or finger 212 is close to or touches the touchscreen interface 202 as in touch location 208, interference with an electric field generated by the capacitive interaction between the upper and lower antenna traces 218, 220 alters the voltage in the touch location 208. This voltage change in the touch location 208 can be measured and localized by the perpendicular grid arrangement of the upper and lower antenna traces 218, 220. Additional determinations such as hover height (i.e., when the stylus 210 or finger 212 are slightly above, but not touching, the touchscreen interface 202) and inking (i.e., when the stylus 210 or finger 212 are in actual contact with the touchscreen interface 202) can be made by processing software and circuitry depending upon the significance of change in the electric field.

The display generator 226 may be positioned beneath the glass layer 224. The display generator 226 may be composed of a large array of pixels 228 supported on a pixel substrate 234, e.g., an integrated circuit board providing addressable electronic connections to each of the pixels for control of the pixels 228. Each pixel 228 may be composed of several photoemitting elements 230, for example, red/green/blue light emitters, that generate the display images, and a photo receiving element 232 for receiving light input for other data and control purposes. As noted, each of the layers above the glass layer 224 is transparent. Thus, the light forming the images generated by the pixels 228 by the display generator 226 passes through the digitizer 206, and thus the display images of the touchscreen interface 202 are visible to a user. Several display and touchscreen processing components 236, e.g., processors, memory with software instructions, circuits, etc., are positioned below the display generator 226 and are communicatively coupled to the display generator 226 and the digitizer 206 to provide control of and send data to and receive data from each.

The upper and lower antenna traces 218, 220 form the digitizer 206 within the touchscreen interface 202 are susceptible to noise 240 generated by the display generator 226. For example, noise 240 may be caused by synchronization pulses or other timing signals from the driving circuits in the display generator 226. Noise 240 may be compared to ocean waves with peaks and troughs where there is little variability between all the peaks and little variability in the depths of the troughs, such that there is typically a consistent ceiling and floor to the noise level. Noise 240 from the display generator 226 and other components of the computing device 200 can negatively impact the performance of active stylus 210 or finger 212 during hover and inking. Noise 240 can affect the accuracy of a number of sensor capabilities of a touchscreen interface 202, for example, determination of hover height; accuracy location of the stylus 210 or finger 212 when inking or hovering; jitter, e.g., unpredictable electronic timing noise, usually resulting from clock timing problems or random electronic pulses); and latency, e.g., the length of time that it takes for the computing device 200 to act on a signal due to processing speeds and waiting for other actions in a queue to be processed. In addition, noise 240 from a display generator 226 can change repeatedly in accordance with changing images presented on the touchscreen interface 202 over time.

Because of the decrease in location accuracy of a stylus 210 or finger 212, it is desirable to reduce the impact of noise 240 on the electric fields generated by the digitizer 206. Unfortunately, it is not possible to distinguish between the noise 240, e.g., from the display generator 226, and signals generated by touch from a stylus 210 or finger 212 during user operation. Therefore, an estimation of the level of noise 240 is made, and this level is removed from the overall signal to leave what is most likely to be a signal indicating a touch interaction by a stylus 210 or finger 212.

Noise estimation for a touchscreen interface 202 is typically made at the time of manufacture and preprogrammed into the processing components 236 of the touchscreen interface 202. This noise estimation is static and cannot account for variations in the level of noise 240 in the actual operation of the touchscreen interface 202. The noise level estimation is set as a worst-case scenario value, i.e., the ceiling level, typically with a slight overvalue, since it is not possible to know which image the user will display on the screen and the corresponding locations and intensities of energy in pixels 228 required to render various portions of the image. This overvalued estimation causes the estimation of the hover height of a stylus or finger to be reduced regardless of the actual noise levels. The accuracy is thus degraded, and compensation for jitter is increased unnecessarily.

Offline tuning at the time of manufacture also fails to account for variations across devices during production runs, for example, when "equivalent" components from different suppliers are used in the same lot to meet demand. For example, a manufacturer may use a consistent digitizer 206 but source the display generator 226 from several different manufacturers. Such differences in components may have different noise signatures and levels. Returning to the ocean metaphor, the height of an island (e.g., the digitizer 206) may remain the same, but the level of the ocean around it (e.g., noise 240 from the display generator 226) may rise and fall with the tide (e.g., the brand of the display generator 226).

Manual measurement of noise signatures and levels of various components and subsequent tuning to account for them at the time of manufacture may be very time-consuming. Rather than considering every combination of components potentially used in a computing device 200, the manufacturer may merely build in additional margins, e.g., increase the overvaluing of the worst-case scenario noise level, to cover all possibilities, even though some component options generate much lower noise levels. Tuning during manufacture also raises the risk of "development" error due to manual tuning errors or automatic operations which fail to account for particularities of the build. Again, the simple solution is often to increase the margin for the worst possible level to account for such potential issues.

These solutions for calculating and assigning a static value to noise 240 at the time of manufacture to assist in identifying and separating signals in a touch location 208 are inherently problematic. If the levels of noise 240 are undervalued at the time of manufacture, the noise 240 can trigger false detection of a stylus 210 or finger 212 or other user artifacts such as inking appearing on the display when there is no stylus 210 or finger 212 present. If the levels of noise 240 are overvalued at the time of manufacture, the stylus 210 and finger 212 performance in inking accuracy or determination of hover height will be degraded, resulting in jitter and latency.

These problems with preprogrammed noise estimation at the time of manufacture of a touchscreen interface 302 in a computing device 300 are depicted schematically in FIGS. 3A and 3B. In FIG. 3A, a first set of upper antenna traces 318 on the touchscreen interface 302 are indicated by a set of vertical parallel lines, and a second set of lower antenna traces 320 are indicated by a perpendicular second set of horizontal parallel lines. Voltage levels in the electric field along each of the upper antenna traces 318 are represented by a first set of bars 308x distributed along the horizontal axis. Similarly, voltage levels in the electric field along each of the lower antenna traces 320 are represented by a second set of bars 308y distributed along the vertical axis. Each of the bars of the first and second sets of bars 308x, 308y may be understood as single dimension vectors.

In the example of FIG. 3A, the instantaneous, actual noise caused by the display generator and other electronic components of the computing device 300 is indicated by actual noise levels 340a, 340b. However, the static noise estimation levels preprogrammed for the computing device 300 are indicated by "tuned" noise thresholds 350a, 350b. As is evident from FIG. 3A, the tuned noise thresholds 350a, 350b are higher than the actual noise levels 340a, 340b to account for worst-case scenario noise at all times. In the example of FIG. 3A, two of the voltage level bars 308a, 308b indicate voltage levels in the electric fields along two of the antenna traces 318a, 320a are much higher than the voltage levels of the other antenna traces of the upper and lower antenna traces 318, 320, and are also much higher than both the actual noise levels 340a, 340b and the tuned noise thresholds 350a, 350b. These voltage level bars 308a, 308b indicate that a stylus or finger is likely touching or very close to the touchscreen interface 302 at the intersection of the antenna traces 318a, 320a. Notably, the voltage level bars 308a, 308b would still render an increased voltage level in the electric field even if the magnitude of the tuned noise thresholds 350a, 350b were subtracted from each of the voltage level bars 308x, 308y. Thus, if a noise removal filter were applied to the electric field signals, even based upon the higher, tuned noise thresholds 350a, 350b, the location of the stylus or finger could still be determined.

However, in the example of FIG. 3B, two of the voltage level bars 308a', 308b' indicate voltage levels in the electric fields along two of the antenna traces 318a', 320a' in the computing device 300' are higher than the voltage levels of the other antenna traces of the upper and lower antenna traces 318', 320', and are also slightly higher than the actual noise levels 340a, 340b, but are lower than the tuned noise thresholds 350a', 350b'. These voltage level bars 308a', 308b' likely indicate that a stylus or finger is hovering above the touchscreen interface 302' at the intersection of the antenna traces 318a', 320a', but is not as close to the touchscreen interface 302' as the stylus or finger in FIG. 3A. In this scenario, the increased voltage level in the electric field of the voltage level bars 308a', 308b' would be lost if the magnitude of the tuned noise thresholds 350a', 350b' were subtracted from each of the voltage level bars 308x', 308y'. Thus, if a noise removal filter based upon the higher, tuned noise thresholds 350a', 350b' were applied to the electric field signals, the location of the stylus or finger could not be determined, even though the voltage level of the voltage level bars 308a', 308b' indicating the location of the stylus or finger were actually greater than the actual noise levels 340a', 340b' as indicated in FIG. 3B.

To address the problem of noise resulting in poor recognition of a stylus or finger on or above a touchscreen interface, a methodology for adaptive separation between noise caused by the display generator and other electronics in the computing device and the signals generated by electric field interaction between a stylus or finger and a digitizer is proposed herein. During operation of a touchscreen interface on a computing device, a sensing interval may be implemented to periodically collect input signals, including both stylus/touch signals and noise signals, across the antennas to periodically adjust the level of noise to be filtered. Noise from the display generator, in particular, is characterized as being spatially wide and flat across the entire digitizer panel above the display generator. In contrast, stylus or touch signals are spatially localized to specific antennas on the digitizer and are usually of higher intensity or energy than display generator noise.

Understanding this characteristic difference between display generator noise and stylus/finger signals affords an opportunity to periodically determine and adjust the value attributed to display generator noise before filtering. In one implementation, the antenna traces are arbitrarily split into regions. For example, the overlapping area of antenna traces 1-4 on each of the upper and lower antenna traces may be identified as Region A, the overlapping area of antenna traces 1-4 of the upper antenna traces, and antenna traces 5-8 on the lower antenna traces may be identified as Region B and so on. In an alternative embodiment, the regions may be chosen to overlap. For example, the overlapping area of antenna traces 1-4 on each of the upper and lower antenna traces may be identified as Region A', the overlapping area of antenna traces 1-4 of the upper antenna traces, and antenna traces 4-7 on the lower antenna traces may be identified as Region B', and so on.

FIG. 4 depicts a computing device 400 with a touchscreen interface 402 divided into a number of arbitrary regions A-X. Each of the arbitrary regions A-X may contain a subset of the antenna traces allocated from each of the upper antenna traces and the lower antenna traces passing through the region. As indicated above, each of the regions A-X may contain separate combinations of antenna traces as represented in the regions A-X in FIG. 4, or there may be overlap in antenna traces such that outer antenna traces of a first region may also be included as outer antenna traces in adjacent regions.

One or more common noise-cleaning algorithms may be applied to each separate region A-X. Noise cleaning algorithms identify noise signatures and levels, typically by transforming a sample of a signal at an instant in time into a distribution of frequency ranges, identifying the energy levels in each frequency range, and reducing energy levels in frequencies that exceed certain thresholds. Example noise-cleaning algorithms may include block noise reduction (BNR) filtering, which is typically used to eliminate mosaic noise in video, and carrier-to-noise ratio (CNR) filtering (in which the quotient of the peak power of a sinusoidal video carrier signal during synchronizing pulses divided by the associated system noise power in each four megahertz bandwidth is used as the level of noise reduction for the signal). Both of these filter examples are directed to reducing noise caused by the video display generator beneath the touchscreen digitizer, which may be the primary source of noise interference. Other or additional filters may alternatively or also be used.

Such signal processing can be computationally intense and could overwhelm the resources of processor chips allocated to controlling the touchscreen interface if performed continuously. To avoid overtaxing processing resources, one or more of several resource-reducing protocols may be implemented. For example, only a subset of frequency ranges may be processed, e.g., frequency ranges most likely to exhibit noise from the display generator. By only transforming and considering a few frequency ranges rather than all, the processing requirements are reduced.

Additionally, noise cleaning need not be performed on each frame of video displayed and particularly need not coincide with sync signals generated by the display generator between each frame, which is typically when the noise generated by the display generator in a touchscreen interface is highest. Instead, the noise cleaning algorithms can be run at greater intervals, either ad hoc or interspersed with other processing tasks. By not relying on timing information and/or complicated synchronization, noise cleaning is simpler to implement compared to other methods that do sync with timing signals. Further, the lack of synchronization with the display generator guarantees that the highest noise signal, typically occurring at frame refresh, will overlap with the sensing window periodically, allowing for identification of maximum noise during a sample period. A window methodology as further described herein below may be implemented to identify an appropriate maximum noise threshold for a discrete period that adaptively updates to more relevant values over successive regular time periods. This maximum noise threshold value will, in fact, regularly consider the noise level coinciding with sync signals without formally synchronizing to them.

Further reductions in processing requirements may be achieved by selection of processing algorithms. In some implementations, the same noise-cleaning algorithm may be used on each region A-X. In other implementations, different noise-cleaning algorithms may be used on different regions of the antennas. The different algorithms may be better suited to filter different regions of the touchscreen interface, and some algorithms may be less processor intense than others. In other implementations, it may be adequate to process only subsets of the regions A-X and extrapolate the results across the entirety of the touchscreen interface.

Some of these concepts are represented in FIG. 4 by the bars 404, 406 on two of the sides of the computing device 400. The bars 404, 406 are examples only and suggest (according to the legend) that certain regions of antennas may be processed using a first noise-cleaning algorithm, certain regions of antennas may be processed using a second noise-cleaning algorithm, certain antennas may fall within overlapping regions and their signals used in both the first and second noise-cleaning algorithms, and some regions may not be subject to noise processing at all, thereby reducing the processing requirements. For example, in some implementations, CNR filtering may be used on antenna regions along the edges of the touchscreen interface 402 to identify an edge noise level, and BNR filtering may be used on antenna regions within the center areas of the touchscreen interface 402 to identify an interior noise level. As indicated, not all regions may be subject to direct filtering processes. In some implementations, CNR edge noise levels calculated at the edges may be extrapolated across the entire touchscreen interface 402 as a first noise reduction level, and then BNR filtering may be implemented in a second filter pass over some of the antenna regions, and interior noise levels identified in the second BNR process may further be used, at least in part, as a basis for a second noise reduction level applied across the entire touchscreen interface 402.

By using several or all of these tactics in combination (e.g., regional CNR filtering and BNR filtering or other selective filters on subsets of the touchscreen interface 402), the processor may avoid being overtaxed and can easily provide noise-cleaning for the touchscreen interface. The method closely estimates the display noise over time during user operation with a stylus or finger touch. The noise levels adaptively identified through such ongoing noise processing will more often be closer to the actual noise level at any given time than a statically set level that is at times too high to discern stylus or finger hover or which results in jitter or latency.

If the noise is spatially wide, e.g., the noise level is consistent across multiple adjacent antenna regions, the noise cleaning will be effective, and the residual signals, i.e., the energy levels post-cleaning, will be low in each region. These regions of low, generally uniform energy levels may be referred to as a "common region." The determination of what is "low" may be made by comparing the energy levels with a threshold value. If the energy levels are below the threshold value, they may be classified as "low." The threshold value may be fixed in the algorithm or, more desirably, the threshold value may be an adaptive value, for example, an average value of energy in a common region during the immediately prior sampling iteration, or a similar actual baseline noise-related value. In contrast, if the noise is localized to a few antennas in a region, the cleaning will not be effective on them, and the residual signals will remain high on those antennas, which may be referred to as a "hot region." The determination of what is "high" or "hot" may be made by comparing the energy levels with the threshold value to see if they exceed the threshold value. By performing a statistical comparison between the residual signal levels of different regions after noise cleaning, "hot regions" can be highlighted and removed from noise classification until the statistical criteria across the remaining regions are met. This is because the "hot regions" are more likely indicative of a stylus or touch interaction than background noise and, therefore, should not be considered in the calculation of a threshold noise level for the entire touchscreen interface 402.

The statistical criteria used may be based on the concept of variability, e.g., the ratio between the standard deviation and the average of a distribution. The effectiveness of using variability as the criteria relies on the assumption that most regions, the "common regions," will only include display noise, and the "hot regions" are few and statistically divergent. After excluding the "hot regions," the remaining common regions meeting the variability criteria can be reliably assumed to only contain the display noise. As noted, not all regions need to be processed. Antenna regions covering a sufficient percentage of the of the total digitizer area meeting the variability criteria may be defined as adequate for proper estimation to determine and extrapolate the noise attributable to the display generator across the entire touchscreen interface. The larger the size of the screen, the easier the extrapolation is since the user typically does not cover the entire screen with a hand or pen, so there are usually enough regions of the display that are only affected by the display noise. The noise levels may be calculated by selection of certain metrics from the sampled common regions (for example, maximum residual noise level, minimum residual noise level, average residual noise level, standard deviation of residual noise levels, summing of residual noise levels, etc.), thus reducing processing requirements.

The method can estimate the display noise in this manner due to the use of spatial commonalities (common regions) rather than user-based signals, which are typically spatially localized (hot regions). While not entirely uniform, if it can be validated that there is a large enough region of the screen that the user is not touching, the noise from that region can be used to update the noise estimates across the entire screen. Again, these noise estimates are determined without any actual touch information but rather by determining areas the user is most likely not touching. Algorithms to determine actual touch locations follow the noise determination. In some implementations, touch indications from other algorithms can optionally be used to pre-filter antenna regions that are suspected as hot (e.g., to either reduce processing or improve selectivity of the common antenna region selection). The point is to reduce or remove the noise to better or more easily identify touches.

FIG. 5 schematically depicts an example of a touchscreen adaptive calibration application 500, which may be composed of several program units, each performing one or more or algorithms, that interact with each other and together perform the functions of the larger application 500. As used herein, the terms "program unit" refers to discrete components of software code that each may perform independent tasks or calculations by implementing one or more algorithms and which may be called upon by one or more applications to perform such tasks for the benefit of and use by the larger application 500. As depicted in FIG. 5, in an example implementation of an application 500, a detection manager program unit 502 provides management and orchestration functionality for the application 500 with respect to several other software modules. The detection manager program unit 502 may receive timing signals from a system cycle synchronizer 504. The system cycle synchronizer 504 may provide information from a processor used to implement the application 500, e.g., a processor component of the touchscreen interface. The detection manager program unit 502 may use the timing information from the system cycle synchronizer 504 to schedule activities of other program units in the application 500, including windows for conducting noise level calculations, to avoid overwhelming the available processing resources.

An antenna region manager program unit 506 may be configured to manage signals from the antenna regions within the digitizer of the touchscreen interface (e.g., as shown in the example of FIG. 4). For example, the antenna region manager program unit 506 may manage the selection of antenna regions by an antenna energy sampler program unit 508 for noise filtering to adaptively determine the likely present noise level. The antenna energy sampler program unit 508 may transform the signals from the antenna traces in selected antenna regions into the frequency domain (e.g., using one of many discrete Fourier transform (DFT) algorithms) to identify energy levels within particular frequency ranges. This raw data can be forwarded to one or more filters to further determine the noise level or conduct other analyses. The antenna region manager program unit 506 may further manage which frequency ranges are selected for further processing and thereby help avoid overloading the processor.

The antenna region manager program unit 506 may direct energy sample data from the antenna energy sampler program unit 508 to one or more filters. In the example of FIG. 5, an embodiment is depicted in which a CNR filter 510 is first used on data from selected antenna regions adjacent to the edges of the digitizer. In practice, it is less likely that a stylus or finger touch be along all edges simultaneously. Further, noise from the display generator is likely relatively static around the edges; changes in the image presented by the display generator often change rapidly in the middle where action is but are often static around the edges, which are part of a stationary background image. Therefore, an average noise level along the edges can be extrapolated across all antenna regions of the digitizer with some confidence.

In addition, a BNR filter 512 may then be applied to interior antenna regions chosen by the antenna region manager program unit 506 to refine the noise level identified by the CNR filter 510. The BNR filter 512 may consider the energy level of interior antenna regions in addition to the noise level calculated by the CNR filter 510 at the edges to determine whether the noise level to judge stylus or finger touch should be higher. The use of both the CNR filter 510 and the BNR filter 512 allows for differential performance that takes into account the specific cleaning mechanisms applied in subsequent algorithms (for example, by identifying higher hover height in the middle of the screen compared to the edges). Residual noise levels post filtering by the BNR filter 512 may be passed to a post-BNR noise estimator program unit 514. Notably, "hot regions" identified in data from the BNR filter 512 may be rejected for inclusion in a final residual noise level calculation by the post-BNR noise estimator program unit 514 as potentially containing energy from stylus or finger touch. Inclusion of data from hot regions might improperly skew the noise level too high and thereby mask the signal levels from a stylus or finger interaction with the touchscreen interface.

The post-BNR noise estimator program unit 514 may provide the estimated level of residual noise across the digitizer caused by the display generator and other electronic components to a maximum residual noise level counter program unit 516 that keeps and updates a maximum residual noise level value over several overlapping windows of time, as will be discussed in greater detail with respect to FIGS. 7A and 7B. Information from the post-BNR noise estimator program unit 514 may also be returned to the antenna region manager program unit 506 for use in determining which antenna regions to select for signal sampling for the next iteration of the noise level measurement process. For example, if the post-BNR noise estimator program unit 514 indicates that certain antenna regions are "hot regions," the antenna region manager program unit 506 may decide to select other antenna regions for processing in the next cycle that may be more reflective of the actual noise level. Thus, more antenna regions that do not include hot spots may contribute to the estimation of the actual noise level while still maintaining a low number of regions to limit the processing burden.

The maximum residual noise level counter program unit 516 may pass the likely residual noise level information to a threshold calculator program unit 518, which may convert the residual noise level information into one or more threshold values that can be used by other applications or algorithms that process touch information. Two typical applications or algorithms that may incorporate threshold values related to noise levels affecting the digitizer are a stylus detector algorithm 520a and a touch detector algorithm 520b, which are responsible for identifying the location of the stylus or finger touch, respectively, on contact with or hover over the touchscreen interface. In addition to receiving threshold noise values calculated by the threshold calculator program unit 518, the stylus and touch detector algorithms 520a, 520b may interact with the antenna region manager program unit 506, the antenna energy sampler program unit 508, and other modules or algorithms to coordinate receipt of necessary signal data to calculate the location of a stylus or finger touch. This process is outside the scope of the present disclosure, which is focused on a methodology for adaptively determining a noise level affecting the digitizer of a touchscreen interface during operation.

FIG. 6 is a flow diagram depicting an example method 600 for adaptively determining a noise level within a touchscreen interface of a computing device during operation. In an allocating operation 602 groups of antenna traces within a digitizer of a touchscreen are logically, if not physically, separated into antenna regions. In a filtering operation 604, noise levels in subsets of the defined antenna regions may be sampled and measured using one or more noise filters that primarily focus on removing noise from the video display generator. For example, in one embodiment, a first noise filter may be applied to antenna regions along the edges of the touchscreen interface to determine a likely base noise level from antenna regions unlikely to have high energy levels. All antenna regions may be adjusted to account for these edge noise levels. The first noise filter may be a BNR video noise filter as described above with respect to FIGS. 4 and 5. In an example embodiment, a second noise filter may then be applied to at least some of the antenna regions located away from the edges, e.g., more centrally within the area of the touchscreen interface. To reduce computational processing requirements on the processor, only subsets of regions may be sampled and, for example, an average noise level across the sampled antenna regions may be calculated. Then energy levels across the entire touchscreen digitizer may be reduced by the calculated average noise level. The second noise filter may be a CNR video noise filter as described above with respect to FIGS. 4 and 5. The first and second noise filters described are merely examples and may be used as an initial pass at noise reduction.

After the initial noise filtering, in an identifying operation 606, residual energy levels in the antenna regions are measured to identify antenna regions with high energy levels and antenna regions with low energy levels. While high and low may be relative, differentiations can be made multiple ways. For example, as discussed above, a statistical criteria based, at least in part, on the concept of variability (e.g., a ratio between standard deviation and the average of a distribution of the energy levels of the antenna regions) may be used.

In a discarding operation 608, signal level information from antenna regions with high energy levels is discarded as likely containing energy created by something in addition to display noise, e.g., touch signals. In a determining operation 610, an effective residual noise level caused by the computing device affecting all antenna signal levels in the touchscreen digitizer that may affect determination of touch and hover signals is determined based, at least in part, upon the antenna regions of low energy. For example, an average energy level (or similar calculation such as median or mode) across all common antenna regions may be calculated and this average residual energy level value may be used as the effective residual noise level. In a calibrating operation 612, the energy levels of signals carried by the antenna traces in all antenna regions may be further reduced by the effective residual noise level, for example, as further described herein with respect to FIGS. 7A and 7B.

Once the digitizer has been calibrated by removing the noise, e.g., by reducing the signal levels from the antenna traces by filtering and by the determined effective residual noise level, in an identifying operation 612, a location of stylus or finger interaction with the touchscreen interface may be identified as being in an antenna region with a highest energy level after reducing energy levels in all the antenna regions. The magnitude of the high energy level identified as a touch interaction may be used by stylus or touch detector algorithms to determine whether the stylus or finger interacting with the interface is actually in contact with the interface or whether it is hovering above a location on the touchscreen interface. The method 600 may be repeated regularly, e.g., cyclically during operation of the computing device to update the noise levels affecting the digitizer of the touchscreen interface, thereby providing an adaptive, rather than static, calibration of the digitizer. By this method, stylus and touch interactions are less likely to be lost in device noise resulting from a conservatively-high, static setting for the noise level at the time of manufacture. Further, more accurate determinations of instances of hover and calculations of hover height can be made because the noise level is regularly updated and is not excessively high to account for the worst-case scenario.

As mentioned above, a windowing methodology may be implemented to identify and calculate an effective residual noise level value over a period that is neither excessively high such that touch signals are lost within noise nor too low such that all antenna signals are higher than the noise level and a touch signal cannot be determined among them. The windowing methodology further provides for adaptively changing the effective residual noise level value at regular intervals while the computing device with the touchscreen interface is operational. FIG. 7A schematically depicts an example windowing methodology 700, e.g., as may be performed by the maximum residual noise level counter program unit 516 in the application 500 of FIG. 5, using a set of four overlapping time windows. Each of the time windows is configured to identify and hold the maximum residual noise level value calculated, e.g., by the maximum residual noise level counter program unit 516 during the window period. This maximum residual noise level may be used as the effective residual noise level, and thereby the basis for final noise reduction in the digitizer, during the window period as further described below.

For example, if a first residual noise level value is determined by a first calculation during the window period, this value is saved and used as the maximum residual noise level during the window period. If a second calculation is made during the window period and the second residual noise level is found to be higher than the first residual noise level, then the second residual noise level will replace the first residual noise level as the maximum residual noise level value for the remainder of the window period, unless a higher residual noise level is recorded. However, if the second residual noise level is lower than the first residual noise level, the first residual noise level will be maintained as the maximum residual noise level value used until supplanted by a higher residual noise level value during the period. If a higher residual noise level value is recorded during the window period, the higher value will become the maximum residual noise level value used for calibrating the digitizer.

As indicated in the diagram of FIG. 7A, several windows overlapping periods may be used to hold a maximum residual noise level value for calibration of the digitizer along a timeline. In the example implementation, four overlapping windows are indicated. However, four is an arbitrary number and greater or fewer overlapping windows may be used as desired. The number of windows selected may be understood as a tradeoff between the number of counters and the difference between length of a maximum value hold period and the fractional time (per window length) of "releasing" the maximum value held. A first window 702 (MaxHold window 0) monitors the residual noise level values for a first period and saves the maximum residual noise level value determined during that period, supplanting any prior saved values with greater residual noise level values recorded later during the window period. Upon expiration of the period for the first window, it restarts at a zero value and begins saving new maximum residual noise level values during the new period.

A second window 704 (MaxHold window 1) is of the same window period duration as the first window 702, but initiates one quarter period later than the first window 702 and thus expires one quarter period later than the first window 702. The second window 704 monitors the residual noise level values for a second, later-starting period and saves the maximum residual noise level value determined during that period, supplanting any prior saved values with greater residual noise level values recorded later during the window period.

A third window 706 (MaxHold window 2) is of the same window period duration as the first window 702, but initiates two quarter periods later than the first window 702 and thus expires one quarter period later than the second window 704. The third window 706 monitors the residual noise level values for a third, later-starting period and saves the maximum residual noise level value determined during that period, supplanting any prior saved values with greater residual noise level values recorded later during the window period.

A fourth window 708 (MaxHold window 3) is of the same window period duration as the first window 702, but initiates three quarter periods later than the first window 702 and thus expires one quarter period later than the third window 706. The fourth window 708 monitors the residual noise level values for a fourth, later-starting period and saves the maximum residual noise level value determined during that period, supplanting any prior saved values with greater residual noise level values recorded later during the window period.

As indicated in FIG. 7A, the highest or maximum residual noise level value during the first window 702 will be the value used for final noise reduction for the first period. However, following the first period, a maximum residual noise level value determined in any further period may only be used as the value for noise reduction for a quarter subperiod as indicated in time bar 710. Note that the maximum residual noise level value may be the same as determined in a prior period. For example, the second window 704 overlaps the first window 702 for three quarters of the first window period. Thus, if a maximum residual noise level value is determined during samples taken in the latter three quarters subperiod of the first window 702, this maximum residual noise level value will continue to be the value used for final noise reduction in the first "win1" subperiod corresponding to the second window 704 as indicated in time bar 710.

Similarly, if a maximum residual noise level value determined during samples taken in the latter two quarters of the first window 702 still exceeds residual noise level values determined during the second half of the third window 706, this maximum residual noise level value will continue to be the value used for final noise reduction in the first "win2" subperiod corresponding to the third window 706 as indicated in time bar 710. Likewise, if a maximum residual noise level value determined during samples taken in the last quarter of the first window 702 still exceeds residual noise level values determined during the latter three quarters of the fourth window 708, this maximum residual noise level value will continue to be the value used for final noise reduction in the first "win3" subperiod corresponding to the fourth window 708 as indicated in time bar 710. Thus, it is possible that the maximum residual noise level value could remain the same through four window cycles but will likely change to a reduced noise level at the conclusion of four successive windows because the prior maximum residual noise level value through the prior four windows will have dropped out.

Alternatively, the maximum residual noise level value will more likely change with the transitions between successive first through fourth windows 702, 704, 706, 708. This change in the maximum residual noise level value maintained within the windows may be understood with reference to the example graph 720 depicted in FIG. 7B. The solid line in the example graph 720 represents the actual sampled residual noise levels 722 over time. The dotted line in the example graph 720 represents the stored maximum residual noise level values 724 over time. For each time period 1-9, several residual noise level samples have been taken. During the first period between times 0 and 1, which may be compared to the first window 702 in FIG. 7A, the maximum energy or noise level of the sampled residual noise level 722 is between 3 and 4. However, at the end of the period, the residual noise level increases to almost 6. The stored maximum residual noise level value 724 also rises to almost 6. Between times 1 and 2, the sampled residual noise level 722 drops to below 4 and rises to a maximum of 4 during the period. However, because the windows 702, 704, 706, 708 overlap, the stored maximum residual noise level value 724 remains at 6 until time 2.

Note that at time 2, the sampled residual noise level 722 has dropped to about 3. However, the stored maximum residual noise level value 724 only adjusts to about 4. This is because the residual noise level value for the restarted first window 702 restarting at time 1 records its first sample after the peak at 6, which occurs immediately before the end of the period 0 to 1. Note that the energy level of the first sample of the sampled residual noise level 722 between times 1 and 2 is about 2.5. However, during the period between times 1 and 2, the maximum residual noise level value sampled is about 4, which is the value that the three quarter periods of the next three overlapping windows 704, 706, 708 maintain until the sampled residual noise level exceeds this value in the final quarter of the period between times 2 and 3. The remainder of the graph 720 depicts the difference between the stored maximum residual noise level value 724 and the sampled residual noise level 722 over a longer period of time to provide a better understanding of the effect of the example windowing methodology on the maximum residual noise level value used to calibrate the digitizer in a touchscreen interface.

FIG. 8 illustrates an example computing device 800 for implementing the features and operations of the described technology. The computing device 800 may embody any network-connected and/or network-capable device and may be a client device, such as a laptop computer, a mobile telephone device, a desktop computer, a tablet computer; a server/cloud computer device; an internet-of-things device, e.g., a television, a wireless speaker, a thermostat, a doorbell/security camera, etc.; an electronic accessory, e.g., a game controller, a smart watch, etc.; or another electronic device with one-way or two-way wireless communication capabilities.

The computing device 800 may include one or more processor(s) 802, a memory 804, and one or more storage devices 810. The memory 804 generally includes both volatile memory (e.g., RAM) and nonvolatile memory (e.g., flash memory). An operating system 806 is instantiated in the memory 804 and is executed by the processor(s) 802. The computing device 800 includes a power supply 812, which is powered by one or more batteries or other power storage sources and provides power to other components of the computing device 800. The power supply 812 may also be connected to an external power source that overrides or recharges the built-in batteries or other power sources.

The storage devices 810 of the computing device 800 may include a variety of tangible processor-readable storage media. Tangible processor-readable storage can be embodied by any available media that can be accessed by the computing device 800 and includes both volatile and non-volatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800.

In an example computing device 800, as shown in FIG. 8, one or more software components 808, such as firmware, software applications, instruction modules, communications interface drivers, peripheral drivers, etc., are stored in the memory 804 and/or on the storage device 810, may be instantiated by the operating system 806 and executed by processor(s) 802. Exemplary software applications may include electronic mail programs, scheduling programs, personal information management programs, word processing programs, spreadsheet programs, Internet browser programs, music file management programs, and photograph and video file management programs. The storage device 810 may include one or more tangible storage media devices and may store data used by application software, including locally and globally unique identifiers, requests, responses, and other data and be local to the computing device 800 or may be remote and communicatively connected to the computing device 800.

Various software components 808 described herein may be executable by the one or more processors 802, which may include logic machines configured to execute hardware or firmware instructions. For example, the processors 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors 802 and memory 804 may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe one or more of a hardware component, a software process, or a combination of both, implemented to perform a particular function. It will be understood that different modules, programs, and/or engines may be instantiated from the same application, service, code block, object, library, routine, script, application program interface (API), function, etc. Likewise, the same module, program, and/or engine may be instantiated by different applications, services, code blocks, objects, routines, APIs, functions, etc. When incorporating software, the terms "module," "program," and "engine" may encompass individual or groups of executable files, data files, libraries, drivers, scripts, database records, etc. It may be appreciated that a "service," as used herein, is an application program executable across one or multiple user sessions. A service may be available to one or more system components, programs, and/or other services. In some implementations, a service may run on one or more server computing devices.

The computing device 800 may include a communications interface 814 (e.g., a network adapter) that manages one or more wireless communication circuitry 816 for establishing connections over a wide-area network (WAN) or local-area network (LAN), for example, ethernet ports, wireless transmitters, wireless receivers, or transceivers (i.e., a combined transmitter and receiver), which may be connected to one or more antenna(s) 818 to provide network connectivity (e.g., to mobile phone networks such as LTE and 5G, Wi-Fi®, GPS, Bluetooth®, Near Field Sensing, etc.) or to one or more other devices on a network (e.g., mobile devices, desktop computers, laptop computers, or servers). In some embodiments, multiple wireless communication circuitry 816 and antennas 818 may be employed to communicate incoming and outgoing radiofrequency carrier signals on various different frequency bandwidths and utilize different communication protocols. It should be appreciated that the network connections shown are examples and that other computing devices and structures and protocols for establishing a communications link between the computing device 800 and other devices may be used.

The communications interface 814 may provide for transmission of intangible processor-readable communication signals. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The computing device 800 may include one or more input devices 820 such that a user may enter commands and information (e.g., a touchscreen interface, a keyboard, a mouse, a microphone, etc.). These and other input devices may be coupled to other internal components or modules by one or more device interfaces 822, such as a serial port interface, parallel port, or universal serial bus (USB). The computing device 800 may further include a display device 824, such as an LCD display or an LED display, which may be separate components or may be integrated displays within a touchscreen interface. If a touchscreen interface is provided as an integration of an input device 820 and a display device 824, software code may be provided with the computing device 800 to adaptively determine noise levels affecting a digitizer component of the touchscreen interface caused by the integrated display device 824 and other electrical components to allow for improved noise removal and better touch signal identification by the touchscreen interface.

An example method of adaptively calibrating a touchscreen interface of a computing device may include the following operations. Antenna traces carrying signals having various energy levels within a digitizer of the touchscreen interface may be allocated into antenna regions. A first subset of the antenna regions with first energy levels above a threshold and a second subset of the antenna regions with second energy levels below the threshold may be identified. Signal level information from the first subset of the antenna regions with the first energy levels may be discarded. A noise level, caused by electrical components of the computing device, within the signals in the antenna traces may be determined based at least in part upon the second energy levels within the second subset of the antenna regions. The digitizer may be calibrated by reducing a measurement of the various energy levels of the signals carried within the antenna traces by the noise level. One or more technical benefits of this feature include that the adaptive calibration performs much better than the worst-case offline estimate.

In another example of the method, a location of touch interaction with the touchscreen interface may be isolated as being in a third subset of the antenna regions with a highest energy level after reducing the measurement of the various energy levels of the signals in the antenna regions by the noise level.

In another example of the method, a first noise filter is applied to a fourth subset of the antenna regions bordering an edge of the touchscreen interface to identify an edge noise level. Noise levels in the digitizer may be reduced based, at least in part, upon the edge noise level.

In another example of the method, a second noise filter, different from the first noise filter, may be applied to a fifth subset of the antenna regions positioned apart from the edge of the touchscreen interface to identify an interior noise level. Noise levels in the digitizer may be reduced based, at least in part, upon the interior noise level. One or more technical benefits of the noise filtering features include that substantial initial noise reduction can be effected by sampling subsets of the antennas rather than the entire touchscreen area, limiting required processing power while still providing an effective first pass at real-time noise reduction.

In another example of the method, the first noise filter is a carrier-to-noise ratio (CNR) filter and the second noise filter is a block noise reduction (BNR) filter.

In another example of the method, first noise levels may be sampled within a first time window. Second noise levels may be sampled within a second time window that initiates later than the first time window and partially overlaps in time with the first time window. A first maximum noise level may be selected from among the first noise levels sampled to be the noise level during the first time window. A second maximum noise level may be selected from among the second noise levels sampled to be the noise level during a subperiod of the second time window that does not overlap with the first time window. One or more technical benefits of this feature include that even if the method over- or under-estimates the noise level, it will self-correct within a few seconds with new sample windows, which is again an improvement over factory tuning.

In another example of the method, the selected second maximum noise level is a same value as the selected first maximum noise value for at least a portion of the subperiod of the second time window that does not overlap with the first time window.

In another example implementation, a system for adaptively calibrating a touchscreen interface of a computing device includes one or more hardware computing processors and a memory storage device configured with instructions for directing the one or more hardware computing processors to execute application programs and related programing units. An antenna region manager may, when executed by the hardware computing processors, cause the hardware computing processors to allocate antenna traces carrying signals having various energy levels within a digitizer of the touchscreen interface into antenna regions. A noise estimator may, when executed by the hardware computing processors, cause the hardware computing processors to identify antenna regions with first energy signal levels above a threshold and antenna regions with second energy signal levels below the threshold. The noise estimator may also discard energy level information from the first subset of antenna regions with the first energy levels. The noise estimator may further determine a noise level, caused by electrical components of the computing device, within the signals in the antenna traces based at least in part upon the antenna regions with the second energy signal levels. A threshold calculator may, when executed by the hardware computing processors, cause the hardware computing processors to calibrate a value used to reduce a measurement of the various energy levels of the signals carried by the antenna traces in the antenna regions of the digitizer by the noise level. One or more technical benefits of this feature include that the adaptive calibration performs much better than the worst-case offline estimate.

In another example of the system, a detector may, when executed by the hardware computing processors, cause the hardware computing processors and configured to isolate a location of touch interaction with the touchscreen interface as being in a third subset of the antenna regions with a highest energy level after reducing the measurement of the various energy levels of the signals in the antenna regions by the noise level.

In another example of the system, a first noise filter may, when executed by the hardware computing processors, cause the hardware computing processors to apply a first noise filter to a fourth subset of the antenna regions bordering an edge of the touchscreen interface to identify an edge noise level and reduce noise levels in the digitizer based, at least in part, upon the edge noise level In another example of the system, a second noise filter may be executable by the processors and configured to apply a second noise filter, different from the first noise filter, to a fifth subset of the antenna regions positioned apart from the edge of the touchscreen interface to identify an interior noise level and reduce noise levels in the digitizer based, at least in part, upon the interior noise level. One or more technical benefits of the noise filter features include that substantial initial noise reduction can be effected by the system sampling subsets of the antennas rather than the entire touchscreen area, limiting required processing power while still providing an effective first pass at real-time noise reduction.

In another example of the system, the first noise filter is a carrier-to-noise ratio (CNR) filter and the second noise filter is a block noise reduction (BNR) filter.

In another example of the system, a noise level counter may be executable by the processors and configured to sample first noise levels within a first time window and sample second noise levels within a second time window that initiates later than the first time window and partially overlaps in time with the first time window. The noise level counter may be further configured to select a first maximum noise level from among the first noise levels sampled to be the noise level during the first time window and select a second maximum noise level from among the second noise levels sampled to be the noise level during a subperiod of the second time window that does not overlap with the first time window. One or more technical benefits of this feature include that even if the system over- or under-estimates the noise level, it will self-correct within a few seconds with new sample windows, which is again an improvement over factory tuning.

In another example of the system, the selected second maximum noise level is a same value as the selected first maximum noise value for at least a portion of the subperiod of the second time window that does not overlap with the first time window.

In another example implementation, one or more tangible processor-readable storage media may be embedded with instructions which, when executed by one or more hardware computing processors, cause the one or more hardware computing processors to execute a process on a computing device to adaptively calibrate a touchscreen interface of the computing device. The process may include allocating antenna traces carrying signals having various energy levels within a digitizer of the touchscreen interface into antenna regions. A first subset of the antenna regions with first energy levels above a threshold and a second subset of the antenna regions with second energy levels below a threshold may be identified. Energy level information from the first subset of the antenna regions with the first energy levels may be discarded. A noise level, caused by electrical components of the computing device, within the signals in the antenna traces may be determined based at least in part upon the second energy levels within the second subset of the antenna regions. The digitizer may be calibrated by reducing a measurement of the various energy levels of the signals carried by the antenna traces in the antenna regions by the noise level. One or more technical benefits of this process feature include that the adaptive calibration performs much better than the worst-case offline estimate.

In another example, the one or more tangible processor-readable storage media may further include instructions for isolating a location of touch interaction with the touchscreen interface as being in a third subset of the antenna regions with a highest energy level after reducing the measurement of the various energy levels of the signals in the antenna regions by the noise level.

In another example, the one or more tangible processor-readable storage media may further include instructions for applying a first noise filter to a fourth subset of the antenna regions bordering an edge of the touchscreen interface to identify an edge noise level and reducing noise levels in the digitizer based, at least in part, upon the edge noise level.

In another example, the one or more tangible processor-readable storage media may further include instructions for applying a second noise filter, different from the first noise filter, to a fifth subset of the antenna regions positioned apart from the edge of the touchscreen interface to identify an interior noise level and reducing noise levels in the digitizer based, at least in part, upon the interior noise level. One or more technical benefits of the noise filter process features include that substantial initial noise reduction can be effected by sampling subsets of the antennas rather than the entire touchscreen area, limiting required processing power while still providing an effective first pass at real-time noise reduction.

In another example, the first noise filter is a carrier-to-noise ratio (CNR) filter and the second noise filter is a block noise reduction (BNR) filter.

In another example, the one or more tangible processor-readable storage media may further include instructions for sampling first noise levels within a first time window and sampling second noise levels within a second time window that initiates later than the first time window and partially overlaps in time with the first time window. The instructions may further provide for selecting a first maximum noise level from among the first noise levels sampled to be the noise level during the first time window and selecting a second maximum noise level from among the second noise levels sampled to be the noise level during a subperiod of the second time window that does not overlap with the first time window. One or more technical benefits of this feature include that even if the process over- or under-estimates the noise level, it will self-correct within a few seconds with new sample windows, which is again an improvement over factory tuning.

A means for adaptively calibrating a touchscreen interface of a computing device may include the following components. Antenna trace means for carrying signals of having various energy levels within a digitizer of the touchscreen interface may be allocated into antenna regions. A means for identifying a first subset of the antenna regions with first energy levels above a threshold and a second subset of the antenna regions with second energy levels below the threshold may be provided. Energy level information from the first subset of the antenna regions with the first energy levels may be discarded. A means for determining a noise level, caused by electrical components of the computing device, within the signals in the antenna trace means may determine the noise level based at least in part upon the second energy levels within the second subset of the antenna regions. The digitizer may be calibrated by a calibrating means that reduces a measurement of the various energy levels of the signals carried within the antenna traces in the antenna regions by the noise level.

In another example of the means for adaptively calibrating a touchscreen interface, an isolating means may isolate a location of touch interaction with the touchscreen interface as being in a third subset of the antenna regions with a highest energy level after reducing the measurement of the various energy levels of the signals in the antenna regions by the noise level.

In another example of the means for adaptively calibrating a touchscreen interface, a first noise filter means may be applied to a fourth subset of the antenna regions bordering an edge of the touchscreen interface to identify an edge noise level. Noise levels in the digitizer may be reduced based, at least in part, upon the edge noise level.

In another example of the means for adaptively calibrating a touchscreen interface, a second noise filter means, different from the first noise filter means, may be applied to a fifth subset of the antenna regions positioned apart from the edge of the touchscreen interface to identify an interior noise level. Noise levels in the digitizer may be reduced based, at least in part, upon the interior noise level.

In another example of the means for adaptively calibrating a touchscreen interface, the first noise filter means is a carrier-to-noise ratio (CNR) filter and the second noise filter means is a block noise reduction (BNR) filter.

In another example of the means for adaptively calibrating a touchscreen interface, a sampling means may sample first noise levels within a first time window and second noise levels within a second time window that initiates later than the first time window and partially overlaps in time with the first time window. A selecting means may select a first maximum noise level from among the first noise levels sampled to be the noise level during the first time window. The selecting means may sample a second maximum noise level from among the second noise levels sampled to be the noise level during a subperiod of the second time window that does not overlap with the first time window.

In another example of the means for adaptively calibrating a touchscreen interface, the selected second maximum noise level is a same value as the selected first maximum noise value for at least a portion of the subperiod of the second time window that does not overlap with the first time window.

There is a value in estimating the noise affecting the digitizer in a touchscreen interface separate from all other signals because the noise value is used for almost all algorithms related to touch. The touch algorithms need to be able to ascertain when the signal level cannot be attributed solely to noise, primarily from the display generator, which is significant and non-constant, depending on the pattern presented on the screen. In this sense, the noise level estimation is the limit of the achievable performance for both stylus and touch in regard to sensitivity.

The noise level is the lower limit set for detectable signals, i.e., a signal must rise above the baseline noise level to be considered as a possible touch signal. Most methods for setting this baseline noise level are performed at the time of manufacture as a tuning process, selecting a static level of the display noise at an expected level. The selected static level has always been assumed to be the worst-case scenario, requiring elevated noise level estimations and reduced sensitivity. This has necessitated that the touch and pen detection levels be set significantly higher compared to noise level settings following the methodologies disclosed herein, where active tracking of the actual display noise is possible, and user contamination signals (e.g., palm touches) are removed. Using the methods disclosed herein, touch detections may be as much as three times higher in certain instances, depending on the actual display pattern, without risk of false ghost touch detections rendered due to misinterpretation of the display noise itself during more active display patterns.

Since the method is adaptive, it reacts with some latency to display pattern changes. Additional margins, such as the overlapping time windows described in conjunction with FIGS. 7A and 7B, may be implemented to compensate for possible transition effects, but even with those margins, the adaptive, in-use noise level determination method still performs much better than the worst-case offline estimate. Also, since it is an adaptive process, even if it over- or underestimates the noise level, it will self-correct within a few seconds with new sample windows, which is again an improvement over tuning and other more sensitive methods that have problems with user interaction.

Several performance advantages may be understood in view of this discussion. The methodologies for adaptive noise level detection for a touchscreen interface disclosed herein do not require any new component features or specific hardware in the computing device; they can be implemented with software operating on current touchscreen interface hardware. It can also be delivered as a software upgrade to existing products in the field. Power consumption is negligible as, again, the methodologies use existing architectures and hardware. Because the noise determination method is performed regularly while the touchscreen interface is in use, it is substantially immune to aging of display generators that may generate more noise or change display behavior over time, rendering a static noise level value ineffective. Also, when using the computing device with an external display, with the display generator turned off, and with the touchscreen interface as a drawing pad, the noise level is very low, and sensitivity can be greatly increased, providing a better user experience overall. Examples of improved user experience may include less missed touches, sensitivity to smaller hands, sensitivity to gloved hands, higher pen hover height detection, and more precise button press detection. Such is not possible if the noise level is statically set at the factory.

Adaptive noise level detection for touchscreen interfaces may also provide several manufacturing and cost advantages. Production reliability may be improved because the noise level detection method is agnostic to components; it will calculate an effective noise level based upon whatever manufacturer components are used in any production run, regardless of relative levels of noise produced. Time to market of upcoming product development may be improved due to reduced or removed requirements for noise tuning efforts. Production costs may thus be reduced as well, resulting in larger margins.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language. Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. Moreover, the separation of various system components in the implementations described above should not be understood as requiring such separation in all implementations.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only, and the dimensions, positions, order, and relative sizes reflected in the drawings attached hereto may vary.

The above specification, examples, and data provide a thorough description of the structure and use of exemplary embodiments of the invention as defined in the claims. Although various embodiments of the claimed invention have been described above with a certain degree of particularity or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of adaptively calibrating a touchscreen interface 1. of a computing device comprising:
    allocating, by a hardware computing processor-executable antenna region manager of the computing device, antenna traces carrying signals having various energy levels within a digitizer of the touchscreen interface into antenna regions;
    identifying a first subset of the antenna regions with first energy levels above a threshold and a second subset of the antenna regions with second energy levels below the threshold, after the allocating the antenna traces into the antenna regions;
    determining a noise level, caused by electrical components of the computing device, within the signals in the antenna traces based at least in part upon the second energy levels within the second subset of the antenna regions, wherein the noise level excludes energy level information from the first subset of the antenna regions with the first energy levels; calibrating the digitizer by reducing a measurement of the various energy levels of the signals carried within the antenna traces by the noise level;
    applying a first noise filter to a fourth subset of the antenna regions bordering an edge of the touchscreen interface to identify an edge noise level; and
    reducing noise levels in the digitizer based, at least in part, upon the edge noise level.

2. The method of claim 1 further comprising isolating a location of touch interaction with the touchscreen interface as being in a third subset of the antenna regions with a highest energy level after reducing the measurement of the various energy levels of the signals in the antenna regions by the noise level.

3. A method of adaptively calibrating a touchscreen interface of a computing device comprising:
    allocating antenna traces carrying signals having various energy levels within a digitizer of the touchscreen interface into antenna regions;
    identifying a first subset of the antenna regions with first energy levels above a threshold and a second subset of the antenna regions with second energy levels below the threshold;
    determining a noise level, caused by electrical components of the computing device, within the signals in the antenna traces based at least in part upon the second energy levels within the second subset of the antenna regions, wherein the noise level excludes energy level information from the first subset of the antenna regions with the first energy levels; and
    calibrating the digitizer by reducing a measurement of the various energy levels of the signals carried within the antenna traces by the noise level;
    applying a first noise filter to a fourth subset of the antenna regions bordering an edge of the touchscreen interface to identify an edge noise level; and
    reducing noise levels in the digitizer based, at least in part, upon the edge noise level.

4. The method of claim 3 further comprising:
    applying a second noise filter, different from the first noise filter, to a fifth subset of the antenna regions positioned apart from the edge of the touchscreen interface to identify an interior noise level; and
    reducing noise levels in the digitizer based, at least in part, upon the interior noise level.

5. The method of claim 4, wherein
    the first noise filter is a carrier-to-noise ratio (CNR) filter; and
    the second noise filter is a block noise reduction (BNR) filter.

6. A method of adaptively calibrating a touchscreen interface of a computing device comprising:
    allocating antenna traces carrying signals having various energy levels within a digitizer of the touchscreen interface into antenna regions;
    identifying a first subset of the antenna regions with first energy levels above a threshold and a second subset of the antenna regions with second energy levels below the threshold;
    determining a noise level, caused by electrical components of the computing device, within the signals in the antenna traces based at least in part upon the second energy levels within the second subset of the antenna regions, wherein the noise level excludes energy level information from the first subset of the antenna regions with the first energy levels;
    calibrating the digitizer by reducing a measurement of the various energy levels of the signals carried within the antenna traces by the noise level;
    sampling first noise levels within a first time window;
    sampling second noise levels within a second time window that initiates later than the first time window and partially overlaps in time with the first time window;
    selecting a first maximum noise level from among the first noise levels sampled to be the noise level during the first time window; and
    selecting a second maximum noise level from among the second noise levels sampled to be the noise level during a subperiod of the second time window that does not overlap with the first time window.

7. The method of claim 6, wherein the selected second maximum noise level is a same value as the selected first maximum noise level for at least a portion of the subperiod of the second time window that does not overlap with the first time window.

8. A system for adaptively calibrating a touchscreen interface of a computing device, the system comprising:
    one or more hardware computing processors;
    a memory storage device configured with instructions for directing the one or more hardware computing processors to execute application programs and related programing units including
    an antenna region manager, when executed by the one or more hardware computing processors, causes the one or more hardware computing processors to allocate antenna traces carrying signals having various energy levels within a digitizer of the touchscreen interface into antenna regions;

a noise estimator, when executed by the one or more hardware computing processors, causes the one or more hardware computing processors to identify a first subset of the antenna regions with first energy levels above a threshold and a second subset of the antenna regions with second energy levels below the threshold, after allocation of the antenna traces into the antenna regions; and determine a noise level, caused by electrical components of the computing device, within the signals in the antenna traces based at least in part upon the second energy levels within the second subset of the antenna regions, wherein the noise level excludes energy level information from the first subset of the antenna regions with the first energy levels; and a threshold calculator, when executed by the one or more hardware computing processors, causes the one or more hardware computing processors to calibrate a value used to reduce a measurement of the various energy levels of the signals carried by the antenna traces in the antenna regions of the digitizer by the noise level;

a first noise filter, when executed by the one or more hardware computing processors, causes the one or more hardware computing processors to apply the first noise filter to a fourth subset of the antenna regions bordering an edge of the touchscreen interface to identify an edge noise level; and reduce noise levels in the digitizer based, at least in part, upon the edge noise level.

9. The system of claim 8 further comprising a detector, when executed by the one or more hardware computing processors, causes the one or more hardware computing processors to isolate a location of touch interaction with the touchscreen interface as being in a third subset of the antenna regions with a highest energy level after reducing the measurement of the various energy levels of the signals in the antenna regions by the noise level.

10. A system for adaptively calibrating a touchscreen interface of a computing device, the system comprising:
one or more hardware computing processors;
a memory storage device configured with instructions for directing the one or more hardware computing processors to execute application programs and related programing units including an antenna region manager, when executed by the one or more hardware computing processors, causes the one or more hardware computing processors to allocate antenna traces carrying signals having various energy levels within a digitizer of the touchscreen interface into antenna regions;

a noise estimator, when executed by the one or more hardware computing processors, causes the one or more hardware computing processors to identify a first subset of the antenna regions with first energy levels above a threshold and a second subset of the antenna regions with second energy levels below the threshold; and determine a noise level, caused by electrical components of the computing device, within the signals in the antenna traces based at least in part upon the second energy levels within the second subset of the antenna regions, wherein the noise level excludes energy level information from the first subset of the antenna regions with the first energy levels; and a threshold calculator, when executed by the one or more hardware computing processors, causes the one or more hardware computing processors to calibrate a value used to reduce a measurement of the various energy levels of the signals carried by the antenna traces in the antenna regions of the digitizer by the noise level;

a first noise filter, when executed by the one or more hardware computing processors, causes the one or more hardware computing processors to apply the first noise filter to a fourth subset of the antenna regions bordering an edge of the touchscreen interface to identify an edge noise level; and reduce noise levels in the digitizer based, at least in part, upon the edge noise level.

11. The system of claim 10 further comprising
a second noise filter, when executed by the one or more hardware computing processors, causes the one or more hardware computing processors to
apply the second noise filter, different from the first noise filter, to a fifth subset of the antenna regions positioned apart from the edge of the touchscreen interface to identify an interior noise level; and
reduce noise levels in the digitizer based, at least in part, upon the interior noise level.

12. The system of claim 11, wherein
the first noise filter is a carrier-to-noise ratio (CNR) filter; and
the second noise filter is a block noise reduction (BNR) filter.

13. A system for adaptively calibrating a touchscreen interface of a computing device, the system comprising:
one or more hardware computing processors;
a memory storage device configured with instructions for directing the one or more hardware computing processors to execute application programs and related programing units including an antenna region manager, when executed by the one or more hardware computing processors, causes the one or more hardware computing processors to allocate antenna traces carrying signals having various energy levels within a digitizer of the touchscreen interface into antenna regions;

a noise estimator, when executed by the one or more hardware computing processors, causes the one or more hardware computing processors to identify a first subset of the antenna regions with first energy levels above a threshold and a second subset of the antenna regions with second energy levels below the threshold; and determine a noise level, caused by electrical components of the computing device, within the signals in the antenna traces based at least in part upon the second energy levels within the second subset of the antenna regions, wherein the noise level excludes energy level information from the first subset of the antenna regions with the first energy levels;

a threshold calculator, when executed by the one or more hardware computing processors, causes the one or more hardware computing processors to calibrate a value used to reduce a measurement of the various energy levels of the signals carried by the antenna traces in the antenna regions of the digitizer by the noise level;

a noise level counter, when executed by the one or more hardware computing processors, causes the one or more hardware computing processors to sample first noise levels within a first time window;

sample second noise levels within a second time window that initiates later than the first time window and partially overlaps in time with the first time window;

select a first maximum noise level from among the first noise levels sampled to be the noise level during the first time window; and select a second maximum noise level from among the second noise levels sampled to be the noise level during a subperiod of the second time window that does not overlap with the first time window.

14. The system of claim 13, wherein the selected second maximum noise level is a same value as the selected first maximum noise level for at least a portion of the subperiod of the second time window that does not overlap with the first time window.

15. One or more tangible processor-readable storage media embedded with instructions which, when executed by one or more hardware computing processors, cause the one or more hardware computing processors to execute a process on a computing device to adaptively calibrate a touchscreen interface of the computing device, the process comprising:

allocating antenna traces carrying signals having various energy levels within a digitizer of the touchscreen interface into antenna regions;

identifying a first subset of the antenna regions with first energy levels above a threshold and a second subset of the antenna regions with second energy levels below a threshold, after the allocating the antenna traces into the antenna regions;

determining a noise level, caused by electrical components of the computing device, within the signals in the antenna traces based at least in part upon the second energy levels within the second subset of the antenna regions, wherein the noise level excludes energy levels information from the first subset of the antenna regions with the first energy levels; and calibrating the digitizer by reducing a measurement of the various energy levels of the signals carried by the antenna traces in the antenna regions by the noise level;

applying a first noise filter to a fourth subset of the antenna regions bordering an edge of the touchscreen interface to identify an edge noise level; and reducing noise levels in the digitizer based, at least in part, upon the edge noise level.

16. The one or more tangible processor-readable storage media of claim 15, wherein the process further comprises isolating a location of touch interaction with the touchscreen interface as being in a third subset of the antenna regions with a highest energy level after reducing the measurement of the various energy levels of the signals in the antenna regions by the noise level.

17. One or more tangible processor-readable storage media embedded with instructions which, when executed by one or more hardware computing processors, cause the one or more hardware computing processors to execute a process on a computing device to adaptively calibrate a touchscreen interface of the computing device, the process comprising:

allocating antenna traces carrying signals having various energy levels within a digitizer of the touchscreen interface into antenna regions;

identifying a first subset of the antenna regions with first energy levels above a threshold and a second subset of the antenna regions with second energy levels below a threshold;

determining a noise level, caused by electrical components of the computing device, within the signals in the antenna traces based at least in part upon the second energy levels within the second subset of the antenna regions, wherein the noise level excludes energy levels information from the first subset of the antenna regions with the first energy levels; and calibrating the digitizer by reducing a measurement of the various energy levels of the signals carried by the antenna traces in the antenna regions by the noise level;

applying a first noise filter to a fourth subset of the antenna regions bordering an edge of the touchscreen interface to identify an edge noise level; and reducing noise levels in the digitizer based, at least in part, upon the edge noise level.

18. The one or more tangible processor-readable storage media of claim 17, wherein the process further comprises:

applying a second noise filter, different from the first noise filter, to a fifth subset of the antenna regions positioned apart from the edge of the touchscreen interface to identify an interior noise level; and reducing noise levels in the digitizer based, at least in part, upon the interior noise level.

19. The one or more tangible processor-readable storage media of claim 18, wherein the first noise filter is a carrier-to-noise ratio (CNR) filter; and the second noise filter is a block noise reduction (BNR) filter.

20. One or more tangible processor-readable storage media embedded with instructions which, when executed by one or more hardware computing processors, cause the one or more hardware computing processors to execute a process on a computing device to adaptively calibrate a touchscreen interface of the computing device, the process comprising:

allocating antenna traces carrying signals having various energy levels within a digitizer of the touchscreen interface into antenna regions;

identifying a first subset of the antenna regions with first energy levels above a threshold and a second subset of the antenna regions with second energy levels below a threshold;

determining a noise level, caused by electrical components of the computing device, within the signals in the antenna traces based at least in part upon the second energy levels within the second subset of the antenna regions, wherein the noise level excludes energy levels information from the first subset of the antenna regions with the first energy levels;

calibrating the digitizer by reducing a measurement of the various energy levels of the signals carried by the antenna traces in the antenna regions by the noise level;

sampling first noise levels within a first time window;

sampling second noise levels within a second time window that initiates later than the first time window and partially overlaps in time with the first time window;

selecting a first maximum noise level from among the first noise levels sampled to be the noise level during the first time window; and selecting a second maximum noise level from among the second noise levels sampled to be the noise level during a subperiod of the second time window that does not overlap with the first time window.

21. A method of adaptively calibrating a touchscreen interface of a computing device comprising:

allocating, by a hardware computing processor-executable antenna region manager of the computing device, antenna traces carrying signals having various energy levels within a digitizer of the touchscreen interface into antenna regions;

identifying, after allocating the antenna traces into the antenna regions, a first subset of the antenna regions within a digitizer and a second subset of the antenna regions within the digitizer, the first subset of the antenna regions having first energy levels above a threshold and the second subset of the antenna regions having second energy levels below the threshold;

calibrating the digitizer by reducing a measurement of energy levels of signals carried within antenna traces of the digitizer by a noise level caused by electrical components of the computing device based at least in part on the second energy levels, wherein the noise level excludes energy level information from the first subset of antenna regions with the first energy levels;

isolating a location of touch interaction with the touchscreen interface as being in a third subset of the antenna regions with a highest energy level after reducing the measurement of the various energy levels of the signals in the antenna regions by the noise level;

applying a first noise filter to a fourth subset of the antenna regions bordering an edge of the touchscreen interface to identify an edge noise level; and reducing noise levels in the digitizer based, at least in part, upon the edge noise level.

\* \* \* \* \*